United States Patent
Nakajima et al.

[11] Patent Number: 6,148,270
[45] Date of Patent: Nov. 14, 2000

[54] FAST TARGET DISTANCE MEASURING DEVICE AND HIGH-SPEED MOVING IMAGE MEASURING DEVICE

[75] Inventors: Hiroshi Nakajima; Koji Kobayashi, both of Tokyo, Japan

[73] Assignee: Yamatake-Honeywell Co., Ltd., Japan

[21] Appl. No.: 08/961,552

[22] Filed: Oct. 30, 1997

[30] Foreign Application Priority Data

| Oct. 30, 1996 | [JP] | Japan | 8-288081 |
| Oct. 31, 1996 | [JP] | Japan | 8-290466 |
| Nov. 1, 1996 | [JP] | Japan | 8-291541 |

[51] Int. Cl.$^7$ ............... G06K 9/62; G01B 11/24
[52] U.S. Cl. ............ 702/97; 382/124; 382/210; 356/376
[58] Field of Search ............... 702/97; 382/124, 382/210, 278; 356/376

[56] References Cited

U.S. PATENT DOCUMENTS

| 5,668,631 | 6/1999 | Norita et al. | 356/376 |
| 5,915,034 | 6/1999 | Nakajima et al. | 382/124 |

FOREIGN PATENT DOCUMENTS

| 7-108526 | 4/1995 | Japan | B28D 5/02 |
| 7-254062 | 10/1995 | Japan | G06T 7/00 |

OTHER PUBLICATIONS

D. V. Papadimitriou, et al. "Stero Disparity Analysis Using Phase Correlation" Electronic Letters vol. 30, No. 18, Sep. 1, 1994.

M. Ramirez, et al. "3–D Digital Surface Recovery of the Optic Nerve Head From Stero Fundus Images"; Proceedings of the Annual Symposium on Computer–Based Medical Syste, Durham, Jun. 14–17, 1992.

John (Juyang) Weng: "Image Matching Using the Windowed Fourier Phase"; International Journal of Computer Vision, Vo. 11, No. 3, Dec. 1, 1993.

"Introduction to Computer Image Processing", Japan Industrial Technology center pp. 44–45, Jun. 1990.

"Fingerprint Identification Algorithm Using 2–D DFT", Savemation Review pp. 2–7, Feb., 1995.

"Fingerprint Identification System Using Liquid Crystal Spatial Light Modulators for Phase Modulation", The Instisute of Electronics Conference D–287, Sep., 1993.

*Primary Examiner*—Kamini Shah
*Attorney, Agent, or Firm*—Blakely Sokoloff Taylor & Zafman

[57] ABSTRACT

A distance measuring device includes first and second cameras, first and second Fourier pattern data generating sections, a pattern processing section, and a distance measuring section. The two cameras are spaced apart from each other by a predetermined distance. The first Fourier pattern data generating section generates first two-dimensional Fourier pattern data by performing two-dimensional discrete Fourier transform for image data picked up by the first camera as first pattern data. The second Fourier pattern data generating section generates second Fourier two-dimensional pattern data by performing two-dimensional discrete Fourier transform for image data picked up by the second camera as second pattern data. The pattern processing section synthesizes the first and second Fourier two-dimensional pattern data, and performs either two-dimensional discrete Fourier transform or two-dimensional discrete inverse Fourier transform for the synthesized data. The distance measuring section obtains a correlation peak in a range excluding a portion near a reference position in a correlation component area appearing in the synthesized Fourier two-dimensional pattern data, and measures the distance to a target on the basis of the distance from a reference position in the correlation component area to the position of the correlation peak.

21 Claims, 37 Drawing Sheets

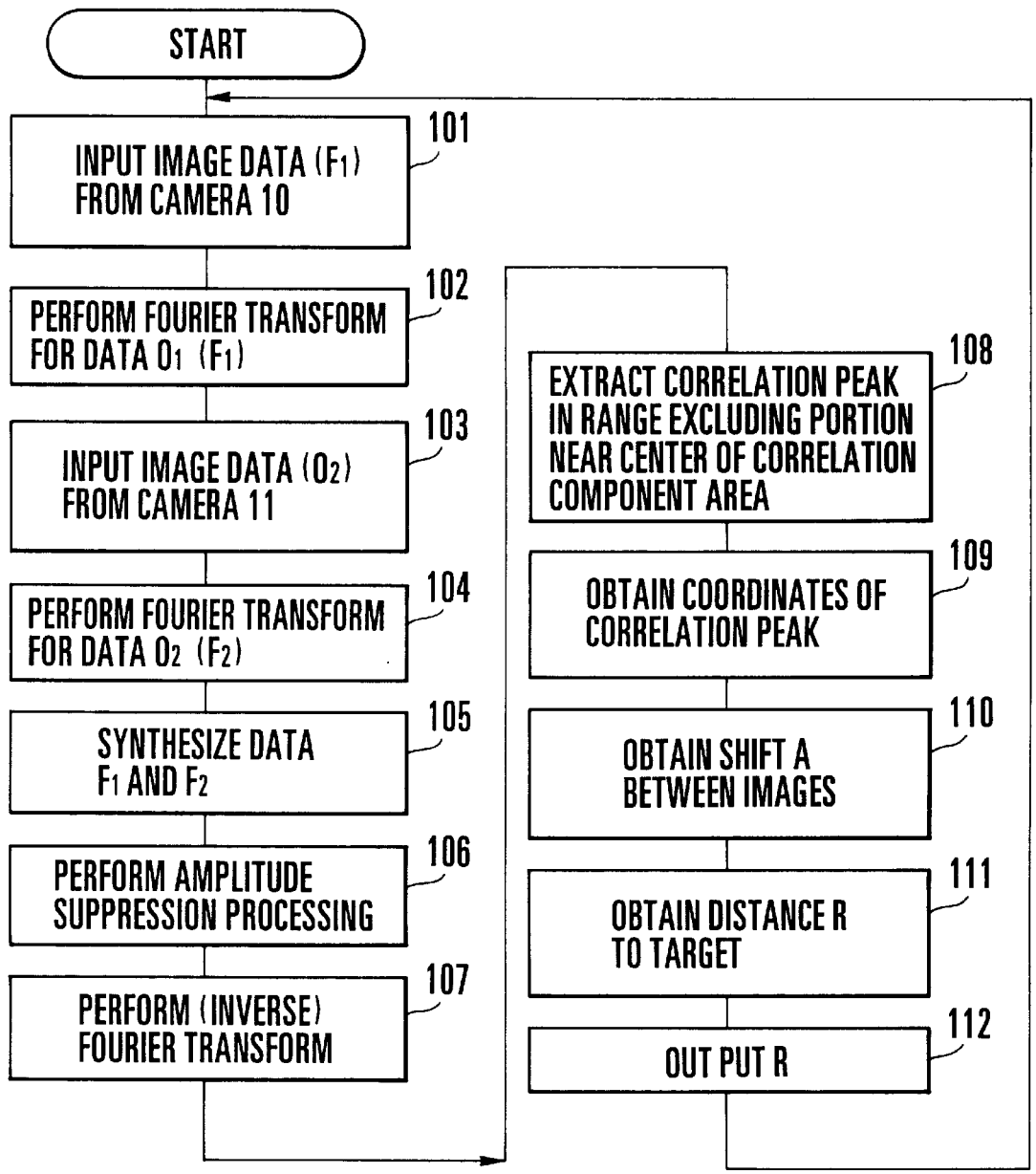
F I G. 3

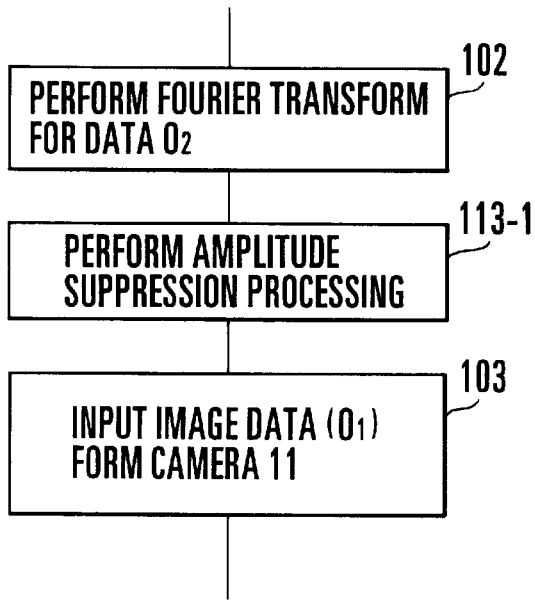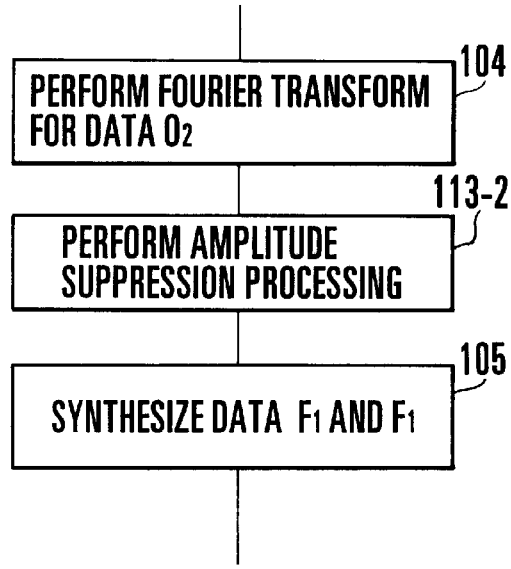
F I G. 4 A　　　　F I G. 4 B
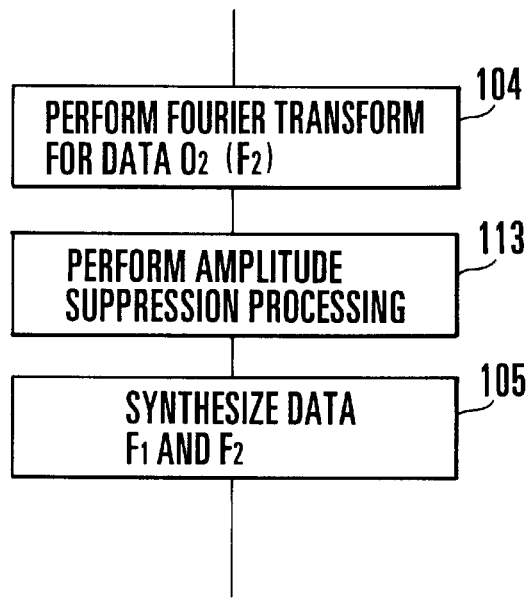
F I G. 4 C

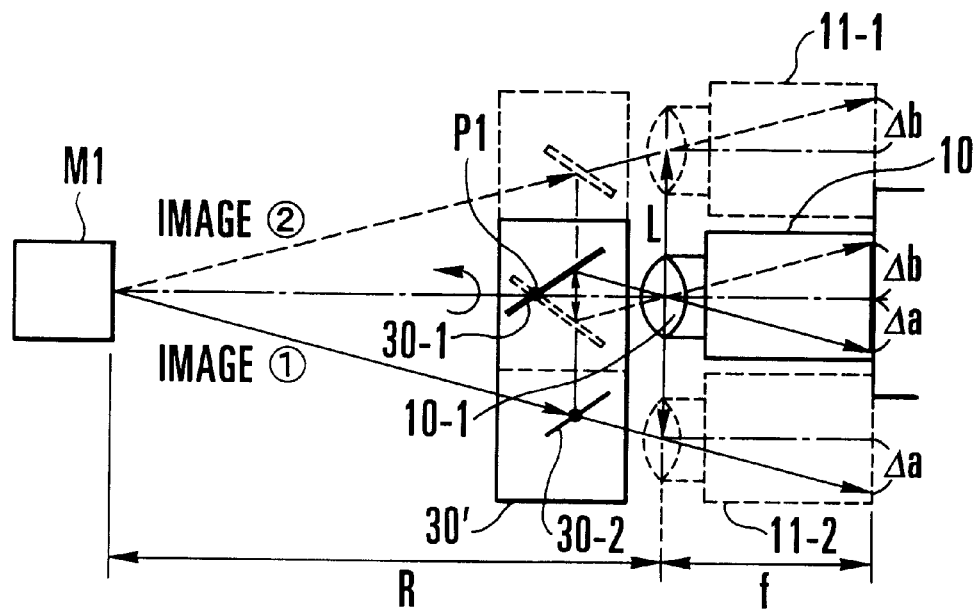
F I G. 11
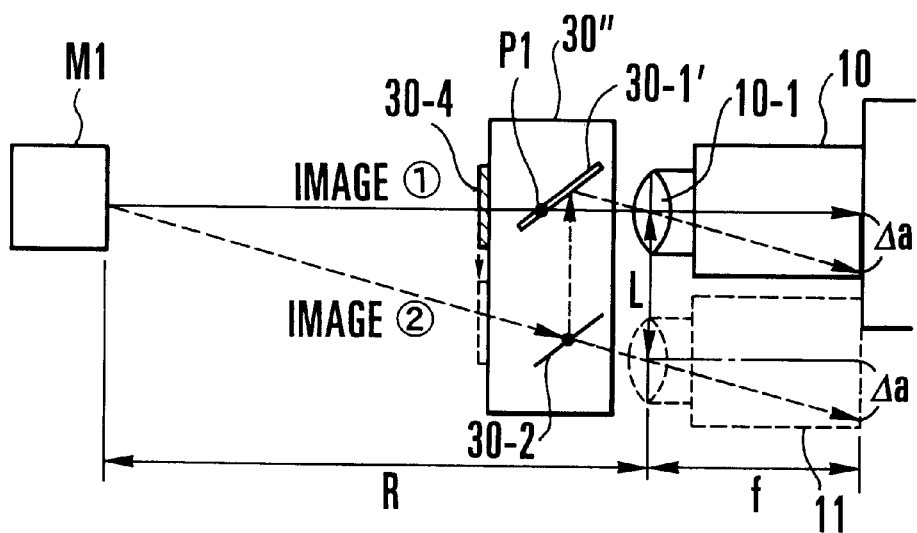
F I G. 12

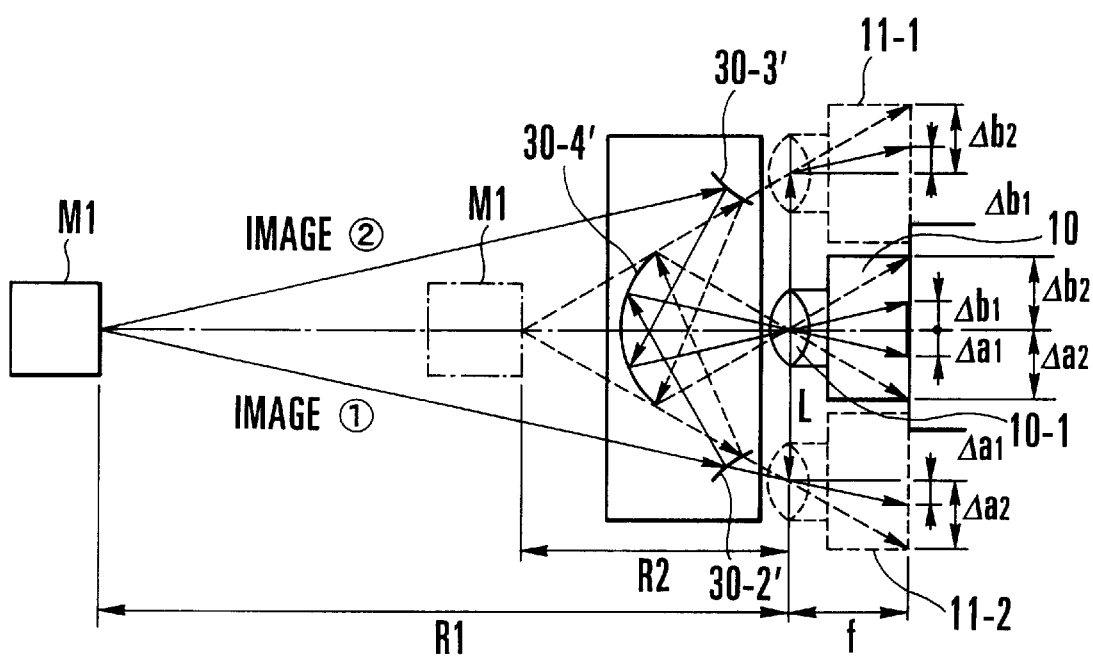
F I G. 15

REGISTRATION

COLLATION

REGISTRATION

COLLATION

O2(1,4)

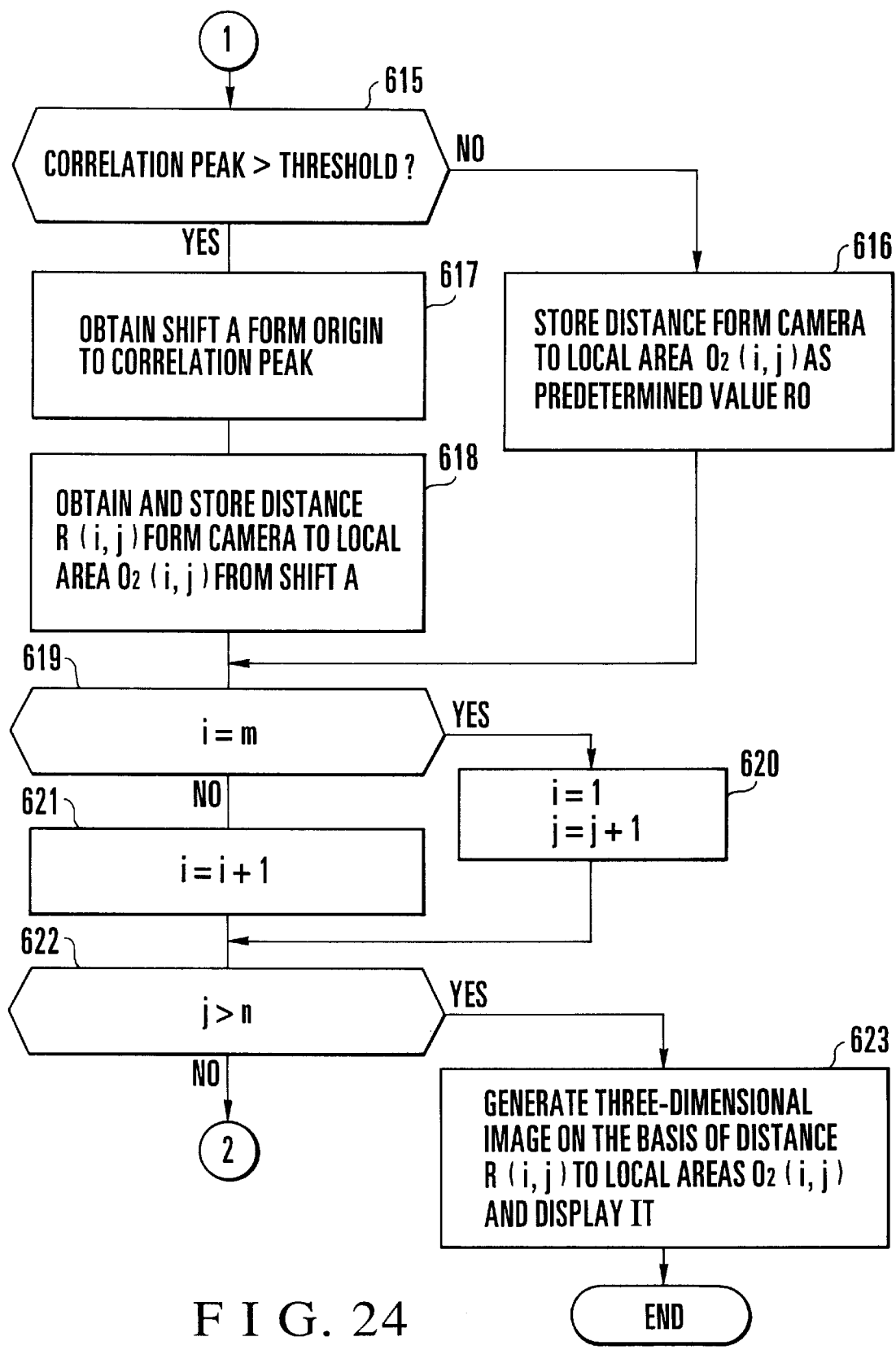
F I G. 24

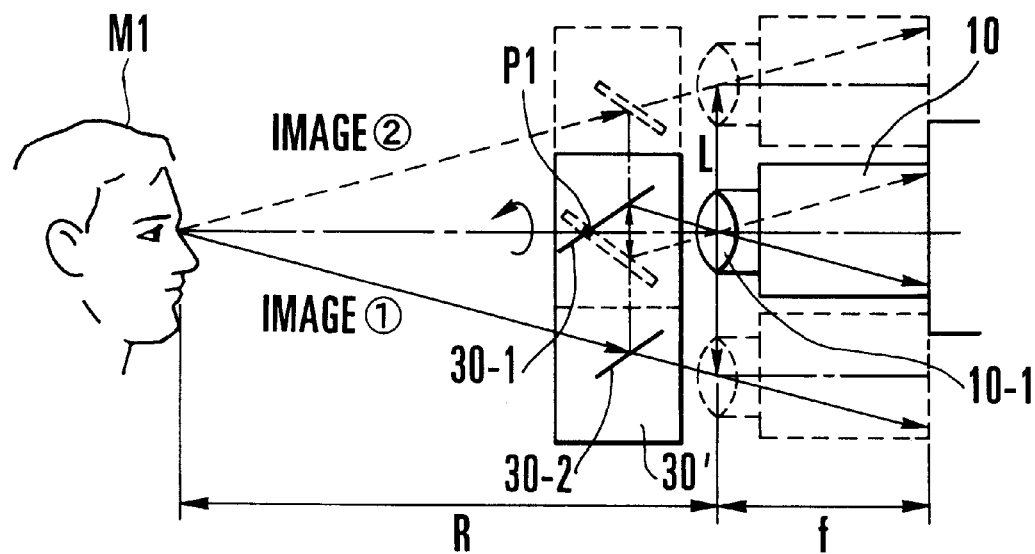
F I G. 27
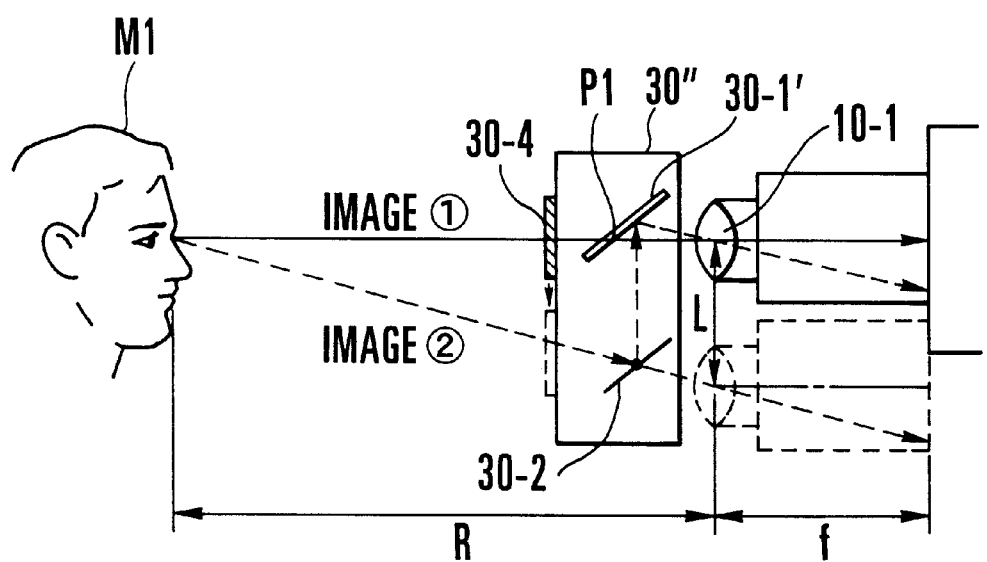
F I G. 28

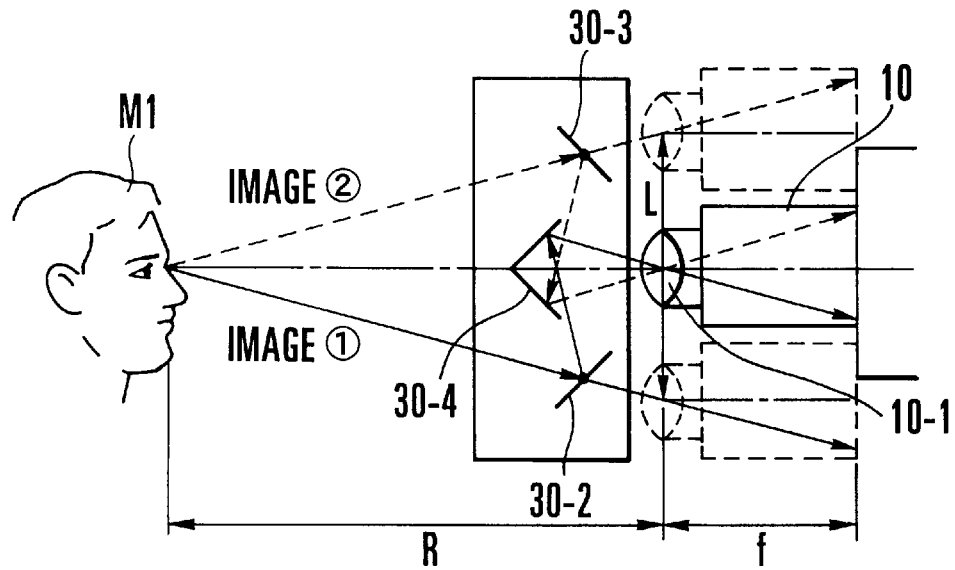
F I G. 29
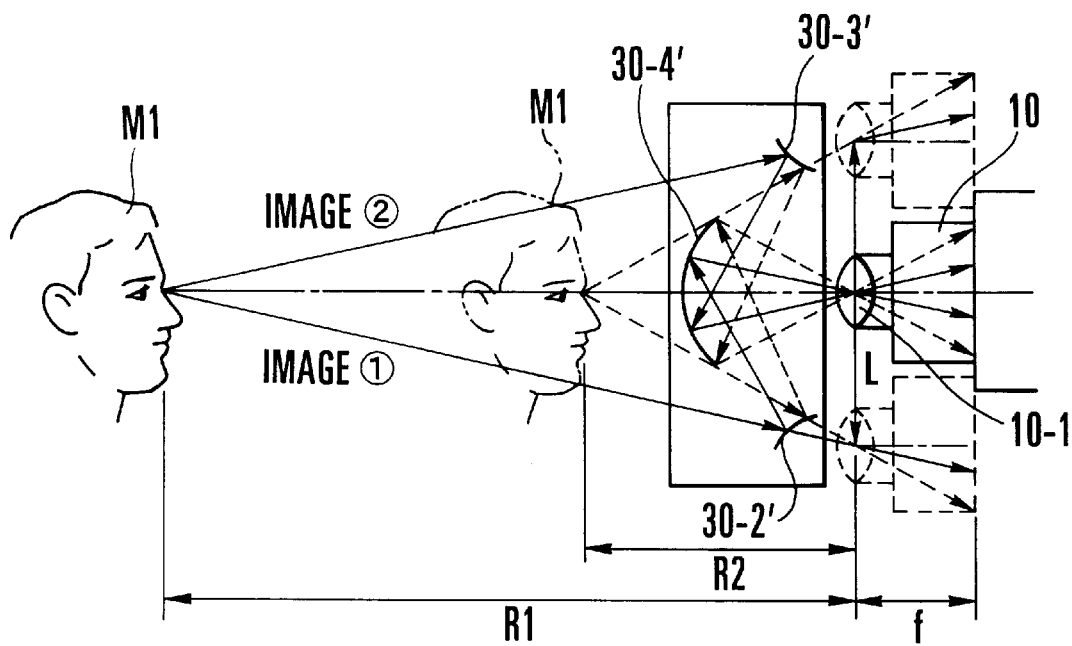
F I G. 30

| INPUT IMAGE DATA | REFERENCE IMAGE DATA |
|---|---|
| 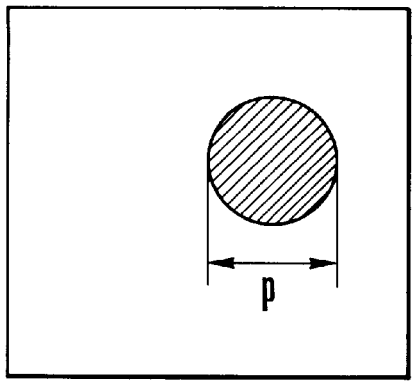 | 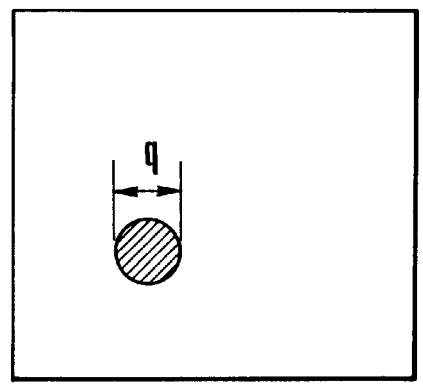 |
| F I G. 34 A | F I G. 34 B |
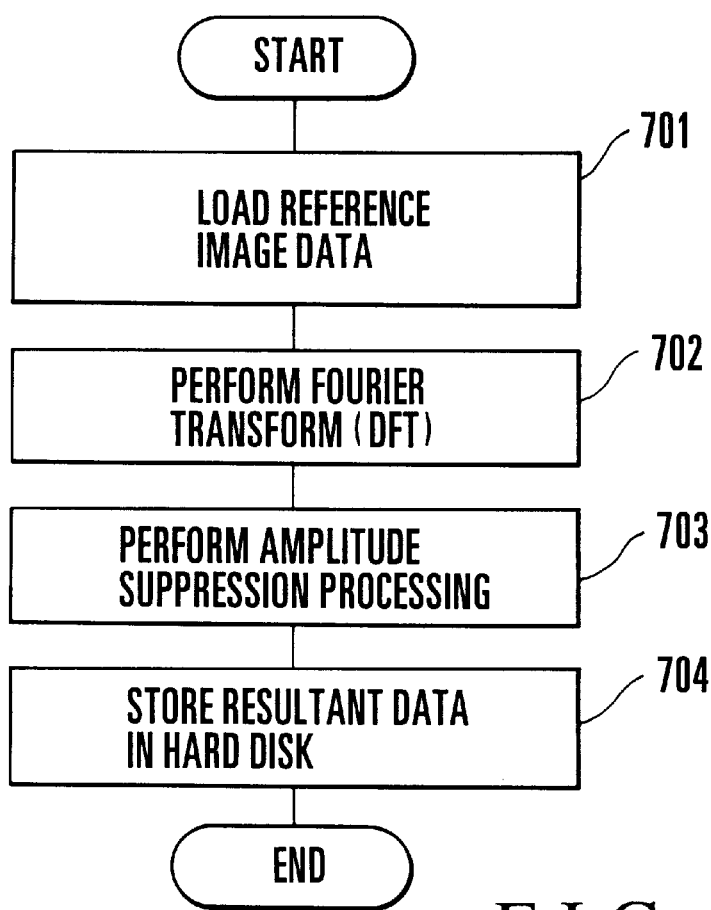
F I G. 35

INPUT IMAGE DATA

REFERENCE IMAGE DATA

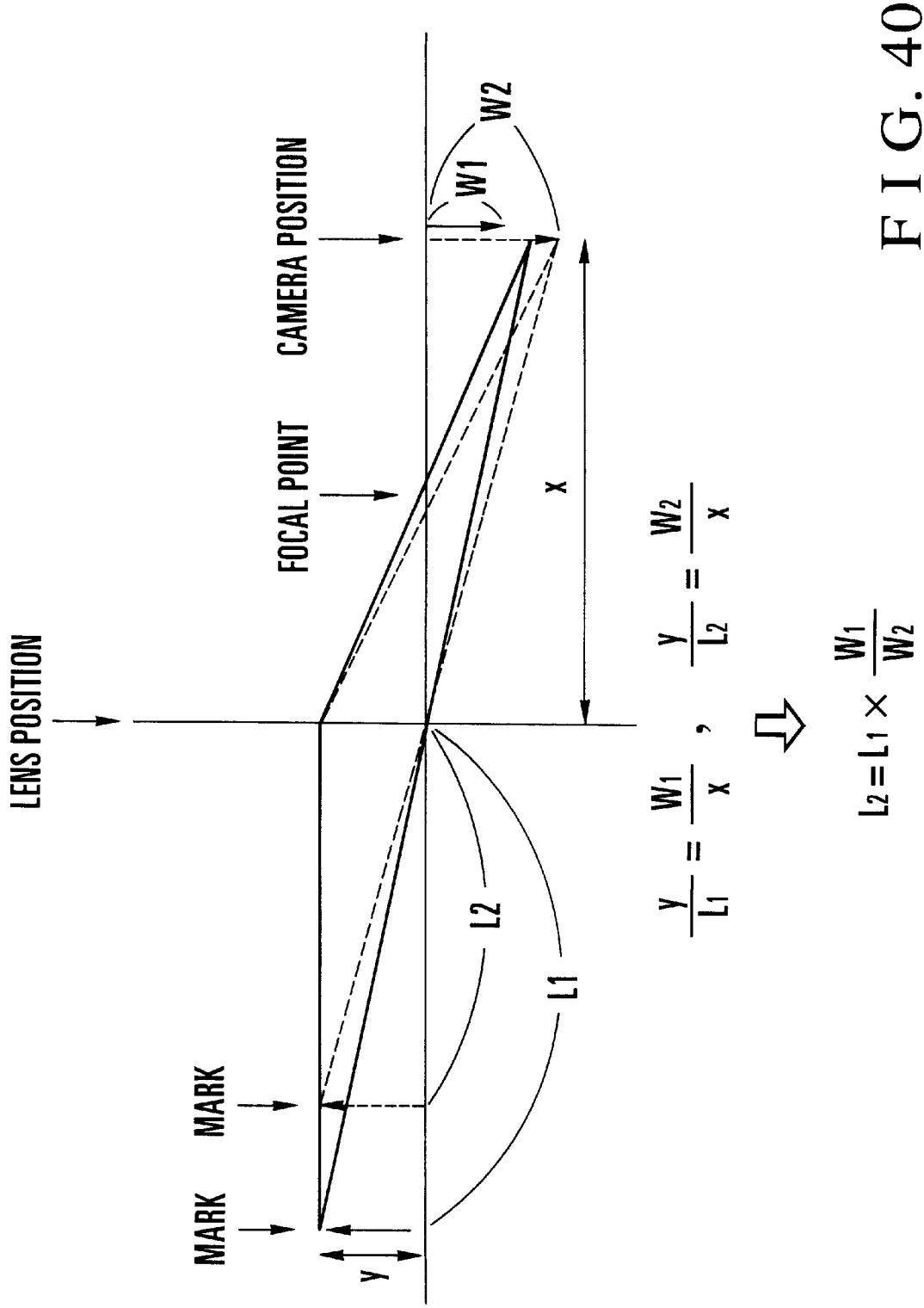
F I G. 40

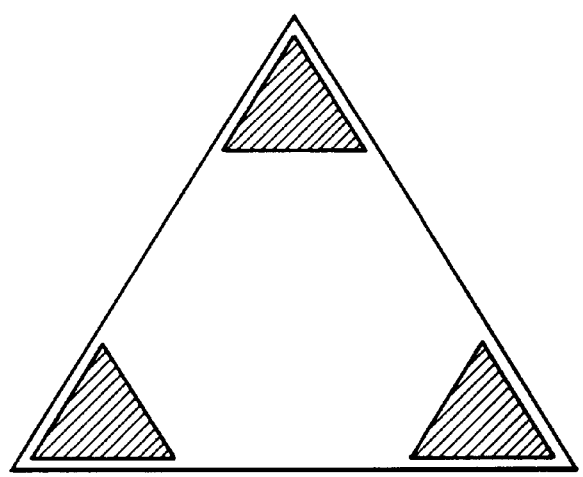
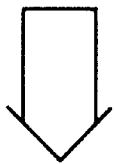
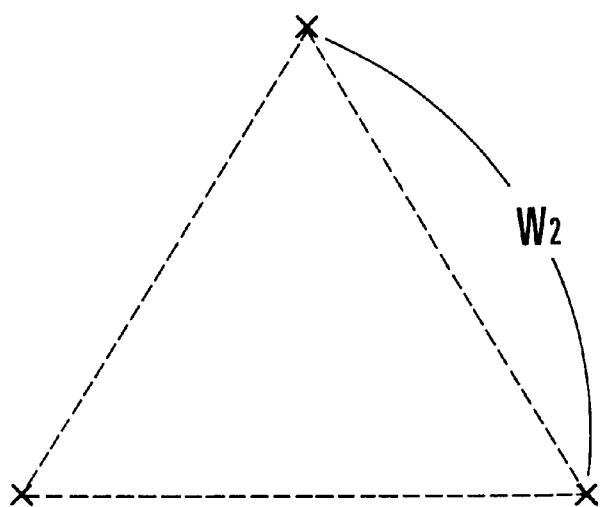
F I G. 41

FAST TARGET DISTANCE MEASURING DEVICE AND HIGH-SPEED MOVING IMAGE MEASURING DEVICE

BACKGROUND OF THE INVENTION

The present invention relates to a distance measuring device for collating image data of an object (target) such as a vehicle or person on the basis of the spatial frequency characteristics, and measuring the distance to the target from the collation result, and a three-dimensional image measuring apparatus for measuring the three-dimensional image of the target from the collation result.

As a conventional distance measuring device of this type, the following device is available. In this device, a target is picked up by two cameras. A window is set on a target image portion of one image. To check whether any portion of the other image coincides with the image in the window, the images are shifted from each other pixel by pixel to search for a position where the sum total of the absolute values of the differences between the respective pixels become minimum. The distance between the images at this position is detected as the shift between the images picked up by the two cameras. The distance to the target is then measured on the basis of this shift.

As a conventional three-dimensional image measuring apparatus of this type, an apparatus whose main part is shown in FIG. 42 is available. Referring to FIG. 42, reference numeral 1 denotes an image receiving section having a CCD camera 1-1 and a light source 1-2; and 2, a rail. In this three-dimensional image measuring apparatus, the image receiving section 1 moves along the rail 2 to scan a still object (the cross-sectional shape of a human face in this case). More specifically, the image receiving section 1 is moved while light from the light source 1-2 is irradiated on the human face. With this operation, the silhouettes of the human face like those shown in FIGS. 43A, 43B, and 43C are respectively obtained at time $T_1$, time $T_2$, and time $T_3$. By receiving such images piece by piece, the cross-sectional shape of the human face, i.e., the three-dimensional image of the object, is measured.

In such a conventional distance measuring device, however, it takes time to obtain an image shift. In addition, since a window must be set, complicated processing is required. Furthermore, the use of the two cameras leads to a high cost.

In such a conventional three-dimensional image measuring apparatus, it takes time to perform measurement. In addition, since a moving mechanism is required to move the image receiving section 1, the cost of the apparatus is high. Furthermore, objects to be measured are limited to still objects. When, therefore, the cross-sectional shape of the face of a person is to be measured, he/she must be kept still.

SUMMARY OF THE INVENTION

The present invention has been made to solve these problems, and has as its object according to the first to fifth aspects of the present invention to provide a distance measuring device which can easily measure the distance to a target within a short period of time.

It is an object of the sixth to ninth aspects and the 16th to 19th aspects of the present invention to provide a low-cost distance measuring device which can easily measure the distance to a target within a short period of time.

It is an object of the 10th to 15th aspects of the present invention to provide a high-speed, low-cost three-dimensional image measuring apparatus which can measure the three-dimensional image of even a moving object.

In order to achieve the above objects, according to the first aspect of the present invention (according to claim 1), first and second cameras are spaced apart from each other by a predetermined distance, image data picked up by the first camera is set as first pattern data, first two-dimensional Fourier pattern data is generated by performing two-dimensional discrete Fourier transform for the first pattern data, image data picked up by the second camera is set as second pattern data, second Fourier two-dimensional pattern data is generated by performing two-dimensional discrete Fourier transform for the second pattern data, the first and second Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a range excluding a portion near a reference position in a correlation component area appearing in the synthesized Fourier two-dimensional pattern data having undergone Fourier transform performed is obtained, and a distance to a target is measured on the basis of a distance from a reference position in the correlation component area to the position of the correlation peak.

According to this aspect, the image data picked up by the first camera is set as first pattern data. First two-dimensional Fourier pattern data is generated by performing two-dimensional discrete Fourier transform for the first pattern data. The image data picked up by the second camera is set as second pattern data. Second Fourier two-dimensional pattern data is generated by performing two-dimensional discrete Fourier transform for the second pattern data. The first and second Fourier two-dimensional pattern data are synthesized. Either two-dimensional discrete Fourier transform or two-dimensional discrete inverse Fourier transform is performed for the resultant synthesized Fourier two-dimensional pattern data. A correlation peak in a range excluding a portion near a reference position in a correlation component area appearing in the synthesized Fourier two-dimensional pattern data having undergone Fourier transform performed is obtained. The distance to the target is measured on the basis of the distance from a reference position in the correlation component area to the position of the correlation peak.

According to the second aspect of the present invention (according to claim 2), the first and second Fourier two-dimensional pattern data are synthesized, and two-dimensional discrete Fourier transform or two-dimensional discrete inverse Fourier transform is performed for the resultant synthesized Fourier two-dimensional pattern data after performing amplitude suppression processing therefor.

According to the third aspect of the present invention (according to claim 3), the image picked up by the first camera is set as first pattern data, first Fourier two-dimensional pattern data is generated by performing amplitude suppression processing for the first pattern data after performing two-dimensional discrete Fourier transform therefor, the image picked up by the second camera is set as second pattern data, and second Fourier two-dimensional pattern data is generated by performing amplitude suppression processing for the second pattern data after performing two-dimensional discrete Fourier transform therefor.

According to the fourth aspect of the present invention (according to claim 4), in the first to third aspects, the inter-lens distance between the first and second cameras is automatically adjusted on the basis of the measured distance to the target.

According to the fifth aspect of the present invention (according to claim 5), in the first to fourth aspects, the first and second cameras are pinhole cameras.

According to the sixth aspect of the present invention (according to claim 6), an image of a target viewed from a first direction and an image of the target viewed from a second direction are guided to an image pickup section of one camera, image data of the target viewed from the first direction and guided to the image pickup section of the camera is set as first pattern data, first Fourier two-dimensional pattern data is generated by performing two-dimensional discrete Fourier transform for the first pattern data, image data of the target viewed from the second direction and guided to the image pickup section of the camera is set as second pattern data, second Fourier two-dimensional pattern data is generated by performing two-dimensional discrete Fourier transform for the second pattern data, the first and second Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a range excluding a portion near a reference position in a correlation component area appearing in the synthesized Fourier two-dimensional pattern data having undergone Fourier transform is obtained, a distance to a target is measured on the basis of a distance from a reference position in the correlation component area to the position of the correlation peak.

According to this aspect, an image of a target viewed from a first direction and an image of the target viewed from a second direction are guided to an image pickup section of one camera. Image data of the target viewed from the first direction and guided to the image pickup section of the camera is set as first pattern data. First Fourier two-dimensional pattern data is generated by performing two-dimensional discrete Fourier transform for the first pattern data. Image data of the target viewed from the second direction and guided to the image pickup section of the camera is set as second pattern data. Second Fourier two-dimensional pattern data is generated by performing two-dimensional discrete Fourier transform for the second pattern data. The first and second Fourier two-dimensional pattern data are synthesized. Either two-dimensional discrete Fourier transform or two-dimensional discrete inverse Fourier transform is performed for the resultant synthesized Fourier two-dimensional pattern data. A correlation peak in a range excluding a portion near a reference position in a correlation component area appearing in the synthesized Fourier two-dimensional pattern data having undergone Fourier transform is obtained. The distance to a target is measured on the basis of the distance from a reference position in the correlation component area to the position of the correlation peak.

According to the seventh aspect of the present invention (according to claim 7), in the sixth aspect, the first and second Fourier two-dimensional pattern data are synthesized, and either two-dimensional discrete Fourier transform or two-dimensional discrete inverse Fourier transform is performed for the resultant synthesized Fourier two-dimensional pattern data after amplitude suppression processing is performed therefor.

According to the eighth aspect of the present invention (according to claim 8), in the sixth aspect, the image data of the target viewed from the first direction and guided to the image pickup section of the camera is set as first pattern data, first Fourier two-dimensional pattern data is generated by performing amplitude suppression processing for the first pattern data after performing two-dimensional discrete Fourier transform therefor, the image data of the target viewed from the second direction and guided to the image pickup section of the camera is set as second pattern data, and second Fourier two-dimensional pattern data is generated by performing amplitude suppression processing for the second pattern data after performing two-dimensional discrete Fourier transform therefor.

According to the ninth aspect of the present invention (according to claim 9), in the sixth to eighth aspects, the camera is a pinhole camera.

According to the 10th aspect of the present invention (according to claim 10), image data of an object viewed from a first direction is set as first pattern data, first Fourier two-dimensional pattern data is generated by performing two-dimensional discrete Fourier transform for the first pattern data, image data of the object viewed from a second direction is set as second pattern data, a local area is cut from the second pattern data, second Fourier two-dimensional pattern data is generated by performing two-dimensional discrete Fourier transform for pattern data of the cut local area, the first and second Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a correlation component area appearing in the synthesized Fourier two-dimensional pattern data having undergone Fourier transform is obtained, and a distance to the local area of the object is measured on the basis of a distance from a reference position in the correlation component area to the position of the correlation peak.

According to this aspect, image data of an object viewed from a first direction is set as first pattern data. First Fourier two-dimensional pattern data is generated by performing two-dimensional discrete Fourier transform for the first pattern data. Image data of the object viewed from a second direction is set as second pattern data. A local area is cut from the second pattern data. Second Fourier two-dimensional pattern data is generated by performing two-dimensional discrete Fourier transform for pattern data of the cut local area. The first and second Fourier two-dimensional pattern data are synthesized. Either two-dimensional discrete Fourier transform or two-dimensional discrete inverse Fourier transform is performed for the resultant synthesized Fourier two-dimensional pattern data. A correlation peak in a correlation component area appearing in the synthesized Fourier two-dimensional pattern data having undergone Fourier transform is obtained. The distance to the local area of the object is measured on the basis of the distance from a reference position in the correlation component area to the position of the correlation peak. With this operation, when local areas are sequentially cut from the second pattern data, and the above processing is repeated, the distance to each local area of the object is measured, and a three-dimensional image can be measured.

According to the 11th aspect of the present invention (according to claim 11), in the 10th aspect, the first and second Fourier two-dimensional pattern data are synthesized, and either two-dimensional discrete Fourier transform or two-dimensional discrete inverse Fourier transform is performed for the resultant synthesized Fourier two-dimensional pattern data after performing amplitude suppression processing is performed therefor.

According to the 12th aspect of the present invention (according to claim 12), in the 10th aspect, the image data of the object viewed from the first direction and guided to the image pickup section of the camera is set as first pattern data, first Fourier two-dimensional pattern data is generated by performing amplitude suppression processing for the first pattern data after performing two-dimensional discrete Fourier transform therefor, second Fourier two-dimensional pattern data is generated by performing amplitude suppression processing for the pattern data of the cut local area cut after performing two-dimensional discrete Fourier transform therefor.

According to the 13th aspect of the present invention (according to claim 13), image data of an object viewed from a first direction is set as first pattern data, the first pattern data is divided into areas in a horizontal or vertical direction, two-dimensional discrete Fourier transform is performed for pattern data of each of the resultant divided areas to generate first Fourier two-dimensional pattern data in units of divided areas, image data of the object viewed from a second direction is set as second pattern data, a local area is cut from the second pattern data, second Fourier two-dimensional pattern data is generated by performing two-dimensional discrete Fourier transform for pattern data of the cut local area, the second Fourier two-dimensional pattern data and the first Fourier two-dimensional pattern data of the divided area to which an area of the first pattern data which corresponds to the local area as a source of the second Fourier two-dimensional pattern data belongs are synthesized, either two-dimensional discrete Fourier transform or two-dimensional discrete inverse Fourier transform is performed for the resultant synthesized Fourier two-dimensional pattern data, a correlation peak in a correlation component area appearing in the synthesized Fourier two-dimensional pattern data having undergone Fourier transform is obtained, and a distance to the local area of the object is measured on the basis of a distance from a reference position in the correlation component area to the position of the correlation peak.

According to this aspect, image data of an object viewed from a first direction is set as first pattern data. The first pattern data is divided into areas in a horizontal or vertical direction. Two-dimensional discrete Fourier transform is performed for pattern data of each of the resultant divided areas to generate first Fourier two-dimensional pattern data in units of divided areas. Image data of the object viewed from a second direction is set as second pattern data. A local area is cut from the second pattern data. Second Fourier two-dimensional pattern data is generated by performing two-dimensional discrete Fourier transform for pattern data of the cut local area. The second Fourier two-dimensional pattern data and the first Fourier two-dimensional pattern data of the divided area to which an area of the first pattern data which corresponds to the local area as a source of the second Fourier two-dimensional pattern data belongs are synthesized. Either two-dimensional discrete Fourier transform or two-dimensional discrete inverse Fourier transform is performed for the resultant synthesized Fourier two-dimensional pattern data. A correlation peak in a correlation component area appearing in the synthesized Fourier two-dimensional pattern data having undergone Fourier transform is obtained. The distance to the local area of the object is measured on the basis of the distance from a reference position in the correlation component area to the position of the correlation peak. With this processing, when local areas are sequentially cut from the second pattern data, and the above processing is repeated, the distance to each local area of the object is measured, and a three-dimensional image can be measured.

According to the 14th aspect of the present invention (according to claim 14), in the 13th aspect, the first and second Fourier two-dimensional pattern data are synthesized, and either two-dimensional discrete Fourier transform or two-dimensional discrete inverse Fourier transform is performed for the resultant synthesized Fourier two-dimensional pattern data after amplitude suppression processing is performed therefor.

According to the 15th aspect of the present invention (according to claim 15), in the 13th aspect, the image data of the object viewed from the first direction is set as the first pattern data, the first pattern data is divided into areas in the horizontal or vertical direction, and first Fourier two-dimensional pattern data is generated in units of divided areas by performing amplitude suppression processing for the pattern data of each of the resultant divided areas after performing two-dimensional discrete Fourier transform therefor, second Fourier two-dimensional pattern data is generated by performing amplitude suppression processing for the pattern data of the local area cut by the local area cutting means after performing two-dimensional discrete Fourier transform therefor.

According to the 16th aspect of the present invention (according to claim 16), there is provided a distance measuring device for measuring a distance to an object having a mark added thereto, wherein image data which is obtained when a reference object to which a collation mark having the same shape as that of the mark is added is viewed at a reference distance is set as reference pattern data, reference Fourier two-dimensional pattern data is generated by performing two-dimensional discrete Fourier transform for the reference pattern data, image data which is obtained when the object to which the mark is added is viewed at a predetermined measuring position is set as input pattern data, input Fourier two-dimensional pattern data is generated by performing two-dimensional discrete Fourier transform for the input pattern data, the reference Fourier two-dimensional pattern data and the input Fourier two-dimensional pattern data are synthesized, either two-dimensional discrete Fourier transform or two-dimensional discrete inverse Fourier transform is performed for the resultant synthesized Fourier two-dimensional pattern data, a pattern contour line indicating a real part or amplitude of the synthesized Fourier two-dimensional pattern data having undergone Fourier transform is extracted, a size of a mark in the input pattern data is detected on the basis of the extracted pattern contour line, and a distance to the object is calculated on the basis of the size of the mark, a reference value for the size, and a distance to the object which realizes the reference value.

According to this aspect, the image data which is obtained when a reference object to which a collation mark having the same shape as that of the mark is added is viewed at the reference distance is set as reference pattern data. Reference Fourier two-dimensional pattern data is generated by performing two-dimensional discrete Fourier transform for the reference pattern data. The image data which is obtained when the object to which the mark is added is viewed at the predetermined measuring position is set as input pattern data. Input Fourier two-dimensional pattern data is generated by performing two-dimensional discrete Fourier transform for the input patten data. The reference Fourier two-dimensional pattern data and the input Fourier two-dimensional pattern data are synthesized. Either two-dimensional discrete Fourier transform or two-dimensional discrete inverse Fourier transform is performed for the resultant synthesized Fourier two-dimensional pattern data.

A pattern contour line indicating a real part or amplitude of the synthesized Fourier two-dimensional pattern data having undergone Fourier transform is extracted. The size of the mark in the input pattern data is detected on the basis of the extracted pattern contour line. The distance to the object is calculated on the basis of the size of the mark, the reference value for the size, and the distance to the object which realizes the reference value.

According to the 17th aspect of the present invention (according to claim 17), in the 16th aspect, the reference Fourier two-dimensional pattern data and the input Fourier two-dimensional pattern data are synthesized, and either two-dimensional discrete Fourier transform or two-dimensional discrete inverse Fourier transform is performed for the resultant synthesized Fourier two-dimensional pattern data after performing amplitude suppression processing is performed therefor.

According to the 18th aspect of the present invention (according to claim 18), in the 16th aspect, image data which is obtained when the object to which the collation mark is added is viewed at the reference distance is set as reference pattern data, reference Fourier two-dimensional pattern data is generated by performing amplitude suppression processing for the reference pattern data after performing two-dimensional discrete Fourier transform therefor, image data which is obtained when the object to which the mark is added is viewed at the predetermined measurement position is set as input pattern data, and input Fourier two-dimensional pattern data is generated by performing amplitude suppression processing for the input pattern data after performing two-dimensional discrete Fourier transform therefor.

According to the 19th aspect of the present invention (according to claim 19), in the 16th to 18th aspects, a circular mark is used as the collation mark in accordance with the mark added to the object.

BRIEF DESCRIPTION OF THE DRAWINGS

FIG. 3 is a flow chart for explaining a distance measuring operation in this distance measuring device;

FIGS. 4A to 4C are flow charts for explaining other distance measuring operations in this distance measuring device;

FIG. 11 is a view showing the main part of still another embodiment of the present invention;

FIG. 12 is a view showing the main part of still another embodiment of the present invention;

FIG. 15 is a view showing the main part of still another embodiment of the present invention;

FIG. 24 is a flow chart for explaining a three-dimensional image measuring operation in this three-dimensional image measuring apparatus;

FIG. 27 is a view showing the main part of another arrangement implementing three-dimensional image measurement with one camera;

FIG. 28 is a view showing the main part of still another arrangement implementing three-dimensional image measurement with one camera;

FIG. 29 is a view showing the main part of still another arrangement implementing three-dimensional image measurement with one camera;

FIG. 30 is a view showing the main part of still another arrangement implementing three-dimensional image measurement with one camera;

FIGS. 34A and 34B are views for explaining reference image data;

FIG. 35 is a flow chart for a registration program;

FIG. 40 is a view for explaining the process of calculating the distance to an object;

FIG. 41 is a view for explaining a process using a triangular mark;

DESCRIPTION OF THE PREFERRED EMBODIMENTS

The embodiments of the present invention will be described in detail below.

Embodiment 1: Distance Measuring Device (First to Fifth Aspects

Figure 2:
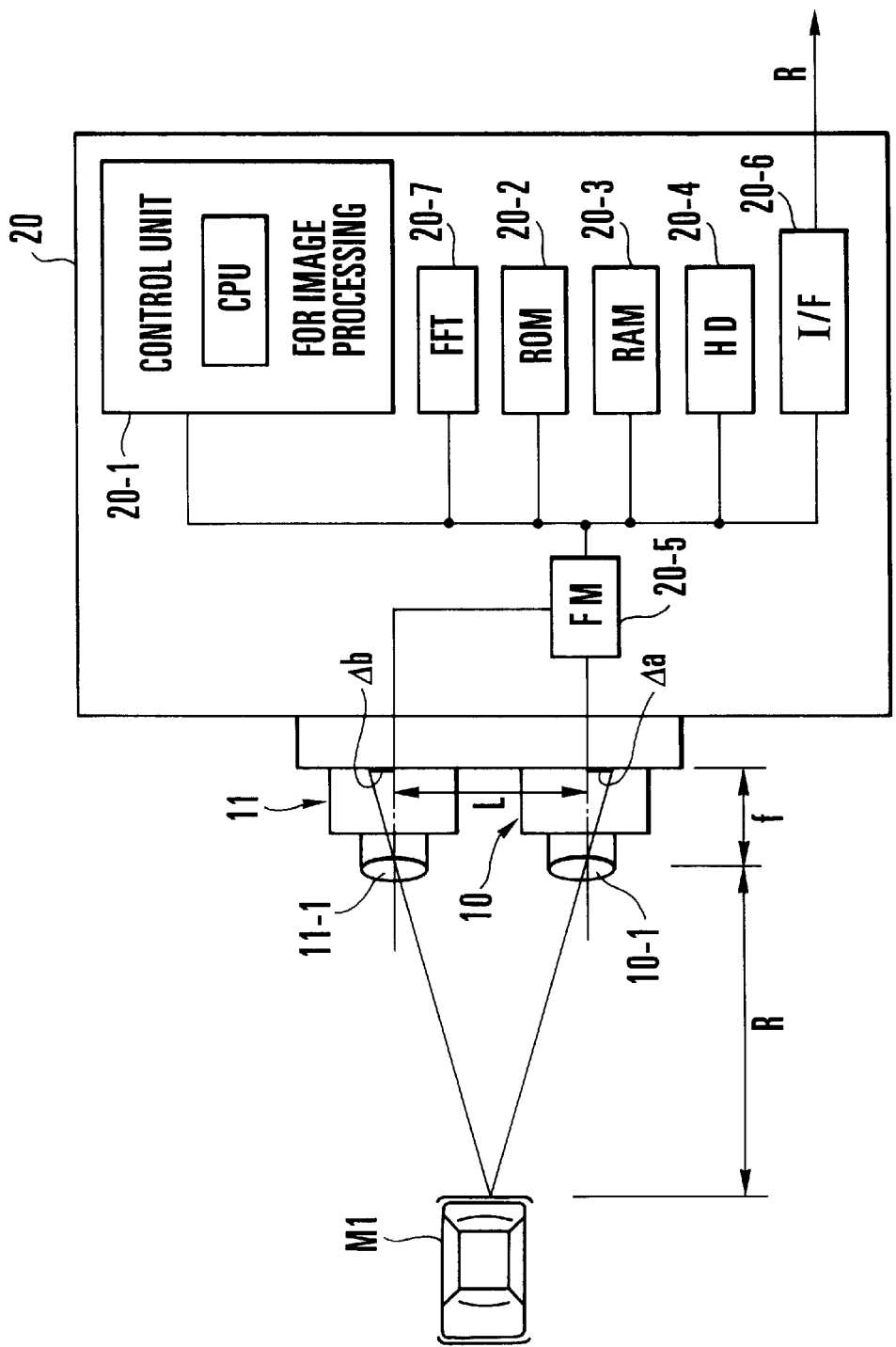
FIG. 2 is a block diagram showing the arrangement of the distance measuring device according to the present invention (first to fifth aspects)

FIG. 2 shows the arrangement of a distance measuring device according to the present invention. Referring to FIG. 2, reference numeral 10 denotes a first CCD camera; 11, a second CCD camera; and 20, a processing section. The processing section 20 includes a control section 20-1 having a CPU, a ROM 20-2, a RAM 20-3, a hard disk (HD) 20-4, a frame memory (FM) 20-5, an external connection section (I/F) 20-6, and a Fourier conversion section (FFT) 20-7. A distance measurement program (FIG. 3) is stored in the ROM 20-2. The CCD cameras 10 and 11 are spaced apart from each other by a distance L. That is, the CCD cameras 10 and 11 are arranged side by side such that the distance L is ensured between lenses 10-1 and 11-1.

Embodiment 1A: First, Second, and Third Aspects

In this distance measuring device, when a target is a vehicle M1, a distance R to the target M1 is measured as follows.

Figures 1A, 1B:
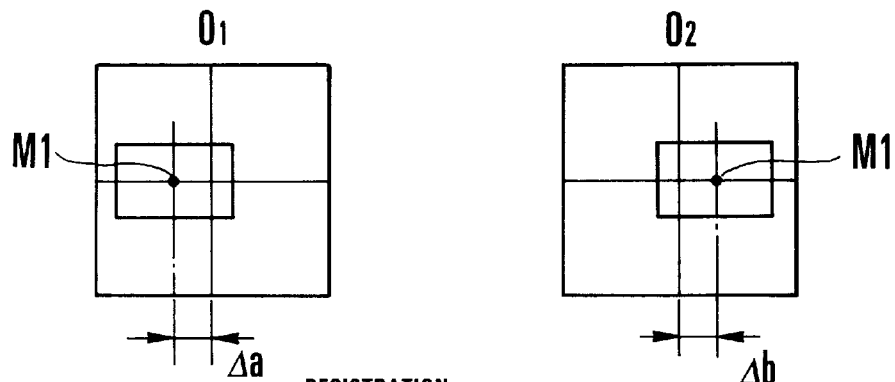
FIGS. 1A to 1D are views for explaining a distance measuring process in a distance measuring device in FIG. 2.

A control section 20-1 loads image data $O_1$ of the target M1 picked up by a first CCD camera 10 through a frame memory 20-5 (step 101). The control section 20-1 sets the loaded image data $O_1$ as registration image data (FIG. 1A), and sends this registration image data to a Fourier conversion section 20-7 to perform two-dimensional discrete Fourier transform (DFT) for this registration image data (step 102). With this operation, the registration image data $O_1$ shown in FIG. 1A becomes Fourier image data (registration Fourier image data) $F_1$.

For example, two-dimensional discrete Fourier transform is described in "Introduction to Computer Image Processing", edited by Japan Industrial Technology Center, published by Souken Shuppan, pp. 44–45 (reference 1) and the like.

The control section 20-1 loads image data $O_2$ of the target M1 picked up by a second CCD camera 11 through the frame memory 20-5 (step 103). The control section 20-1 sets the loaded image data $O_2$ as collation image data (FIG. 1B), and sends this collation image data to the Fourier conversion section 20-7 to perform two-dimensional discrete Fourier transform (DFT) for this collation image data (step 104). With this operation, the collation image data $O_2$ shown in FIG. 1B becomes Fourier image data (collation Fourier image data) $F_2$.

The control section 20-1 then synthesizes the Fourier image data (registration Fourier image data) $F_1$ obtained in step $10_2$ and the Fourier image data (collation Fourier image data) $F_2$ obtained in step 104 to obtain synthesized Fourier image data (step 105).

Letting $A.e^{j\theta}$ be the collation Fourier image data, and $B.e^{j\phi}$ be the registration Fourier image data, this synthesized image data is represented by $A.B.e^{j(\theta-\phi)}$. Note that A, B, θ, and φ are the functions of a frequency (Fourier) space (u, v).

$A.B.e^{j(\theta-\phi)}$ is rewritten as $$A.B.e^{j(\theta-\phi)} = A.B.\cos(\theta-\phi) + j.A.B.\sin(\theta-\phi) \quad (1)$$

If $A.e^{j\theta} = \alpha_1 + j\beta_1$ and $B.e^{j\phi} = \alpha_2 + j\beta_2$, then $A = (\alpha_1^2 \beta_1^2)^{1/2}$, $B = (\alpha_2^2 + \beta_2^2)^{1/2}$, $\theta = \tan^{-1}(\beta_1/\alpha_1)$, and $\phi = \tan^{-1}(\beta_2/\alpha_2)$. By calculating equation (1), synthesized Fourier image data is obtained.

Note that synthesized Fourier image data may be obtained according to $A.B.e^{j(\theta-\phi)} = A.B.e^{j\theta}.e^{-j\phi} = A.e^{j\theta}.B.e^{-j\phi} = (\alpha_1 + j\beta_1).(\alpha_2 - j\beta_1).(\alpha_2 - j\beta_2) = (\alpha_1.\alpha_2 + \beta_1.\beta_2) + j(\alpha_2.\beta_1 - \alpha_1.\beta_2)$.

After the synthesized Fourier image data is obtained in this manner, the control section 20-1 performs amplitude suppression processing for the image data (step 106). In this embodiment, log processing is performed as amplitude suppression processing. More specifically, the log of $A.B.e^{j(\theta-\phi)}$, which is the mathematical expression of the above synthesized Fourier image data, is calculated as $\log(A.B).e^{j(\theta-\phi)}$, thereby suppressing A.B representing the amplitude to $\log(A.B)$ ($A.B > \log(A.B)$).

The synthesized Fourier image data having undergone amplitude suppression processing is less susceptible to the illuminance difference between the case in which the registration data is obtained and the case in which the collation data is obtained. That is, by performing amplitude suppression processing, the spectrum intensity of each pixel is suppressed to cut extreme values. As a result, more information is made effective.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 106, the control section 20-1 sends the synthesized Fourier image data having undergone the amplitude suppression processing to the Fourier transform section 20-7 to perform second two-dimensional discrete Fourier transform (DFT) (step 107).

The control section 20-1 loads the synthesized Fourier image data having undergone DFT, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in the correlation component area from this histogram (step 108), and obtains the coordinates of the extracted correlation peak (step 109).

Figure 1C:
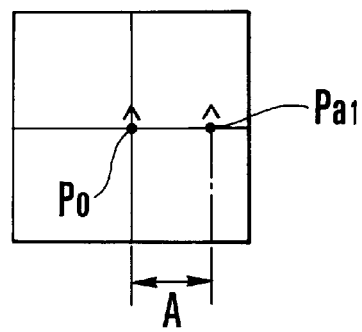

FIG. 1C shows the coordinate position of the correlation peak at this time. Referring to FIG. 1C, reference symbol $P_{a1}$ denotes the position of the correlation peak; and $P_0$, the center of the correlation component area. In this case, the correlation peak $P_{a1}$ indicates the target M1. The distance from the center $P_0$ of the correlation component area to-the position $P_{a1}$ of the correlation peak indicates a shift A ($A=\Delta a+\Delta b$) between the two image data $O_1$ and $O_2$. Note that a correlation peak indicating the background appears near the center $P_0$ of the correlation component area.

The control section 20-1 obtains the shift A between the image data $O_1$ and $O_2$ from the coordinate position of the correlation peak $P_{a1}$ (step 110), and obtains a distance R to the target M1 by equation (2) based on the principle of triangular surveying on the basis of the obtained shift A (step 111). The control section 20-1 outputs the obtained distance R to the target M1 to the outside through the I/F 20-6 (step 112).

$$R=f.L/A \qquad (2)$$

where f is the distance from the center of the lens 10-1 (11-1) to an image pickup position, and L is the distance between the lenses.

As described above, according to the distance measuring device of this embodiment, the image data picked up by the CCD cameras 10 and 11 are collated with each other on the basis of the spatial frequency characteristics to obtain the distance to the target M1 as the collation result. In this scheme, the processing is simplified, and the distance to a target can be measured within a short period of time as compared with the conventional scheme.

In this embodiment, two-dimensional discrete Fourier transform is performed in the Fourier transform section 20-7. However, this processing may be performed in the control section 20-1. In addition, in the embodiment, two-dimensional discrete Fourier transform is performed in step 107 in FIG. 3. However, two-dimensional discrete inverse Fourier transform may be performed instead of two-dimensional discrete Fourier transform. That is, instead of two-dimensional discrete Fourier transform, two-dimensional discrete inverse Fourier transform may be performed for synthesized Fourier image data having undergone amplitude suppression processing. Quantitatively, no change in collation precision occurs whether two-dimensional discrete Fourier transform or two-dimensional discrete inverse Fourier transform is performed. Processing based on two-dimensional discrete inverse Fourier transform is disclosed in reference 1.

In this embodiment, amplitude suppression processing is performed first for synthesized Fourier image data, and two-dimensional discrete Fourier transform is then performed (steps 106 and 107). However, amplitude suppression processing may be performed for the registration and collation Fourier image data before synthesis, and the resultant data may be synthesized. More specifically, step 106 in FIG. 3 may be omitted, and steps 113-1 and 113-2 of performing amplitude suppression processing may be set between steps $10_2$ and 103 and between steps 104 and 105, as shown in FIGS. 4A and 4B. Alternatively, as shown in FIG. 4C, step 106 in FIG. 3 may be omitted, and step 113 of separately performing amplitude suppression processing for the images $O_1$ and $O_2$ may be set between steps 104 and 105.

In this case, registration Fourier image data and collation Fourier image data having undergone amplitude suppression processing are obtained by amplitude suppression processing in step 113. Synthesized Fourier image data is obtained by synthesizing these Fourier image data.

In this case, the suppression ratio of the amplitude of the synthesized Fourier image data is low as compared with the case in which amplitude suppression processing is performed after synthesized Fourier image data is generated (FIG. 3). Therefore, the method of performing amplitude suppression processing after synthesized Fourier image data is generated (FIG. 3) is superior in collation precision to the method of generating synthesized Fourier image data after performing amplitude suppression processing (FIGS. 4A to 4C). In the case in which synthesized Fourier image data is generated after amplitude suppression processing is performed (FIGS. 4A to 4C), two-dimensional discrete inverse Fourier transform may be performed for the synthesized Fourier image data instead of two-dimensional discrete Fourier transform.

In this embodiment, amplitude suppression processing is performed, but need not always be performed.

In this embodiment, the image data from the CCD camera 10 is set as registration image data, and the image data from the CCD camera 11 is set as collation image data. These data are then collated with each other on the basis of the spatial frequency characteristics to obtain the distance from the center of the correlation component area to the position of the correlation peak as the shift A. Even if, however, the image data form the CCD camera 10 is set as collation image data, and the image data from the CCD camera 11 is set as registration image data, the shift A between the two images can be obtained in the same manner as described above.

Figure 1D:
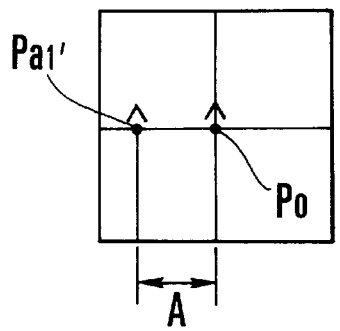

In this case, the data in FIG. 1D is obtained with respect to the data in FIG. 1C. That is, a correlation peak $P_{a1}'$ appears at the opposite position to the correlation peak $P_{a1}$ in FIG. 1D with respect to the center $P_0$ of the correlation area. In this case, therefore, the distance from the position of the correlation peak $P_{a1}'$ to the center $P_0$ of the correlation component area is obtained as the shift A between the two images.

Embodiment 1B: Fourth Aspect

In the above embodiment, the distance L between the lenses of the CCD cameras 10 and 11 is kept constant. The distance L between the lenses, however, may be changed in accordance with the distance R to the target M1. If the distance L between the lenses increases with an increase in the distance R, the measurement precision improves.

Figure 5:
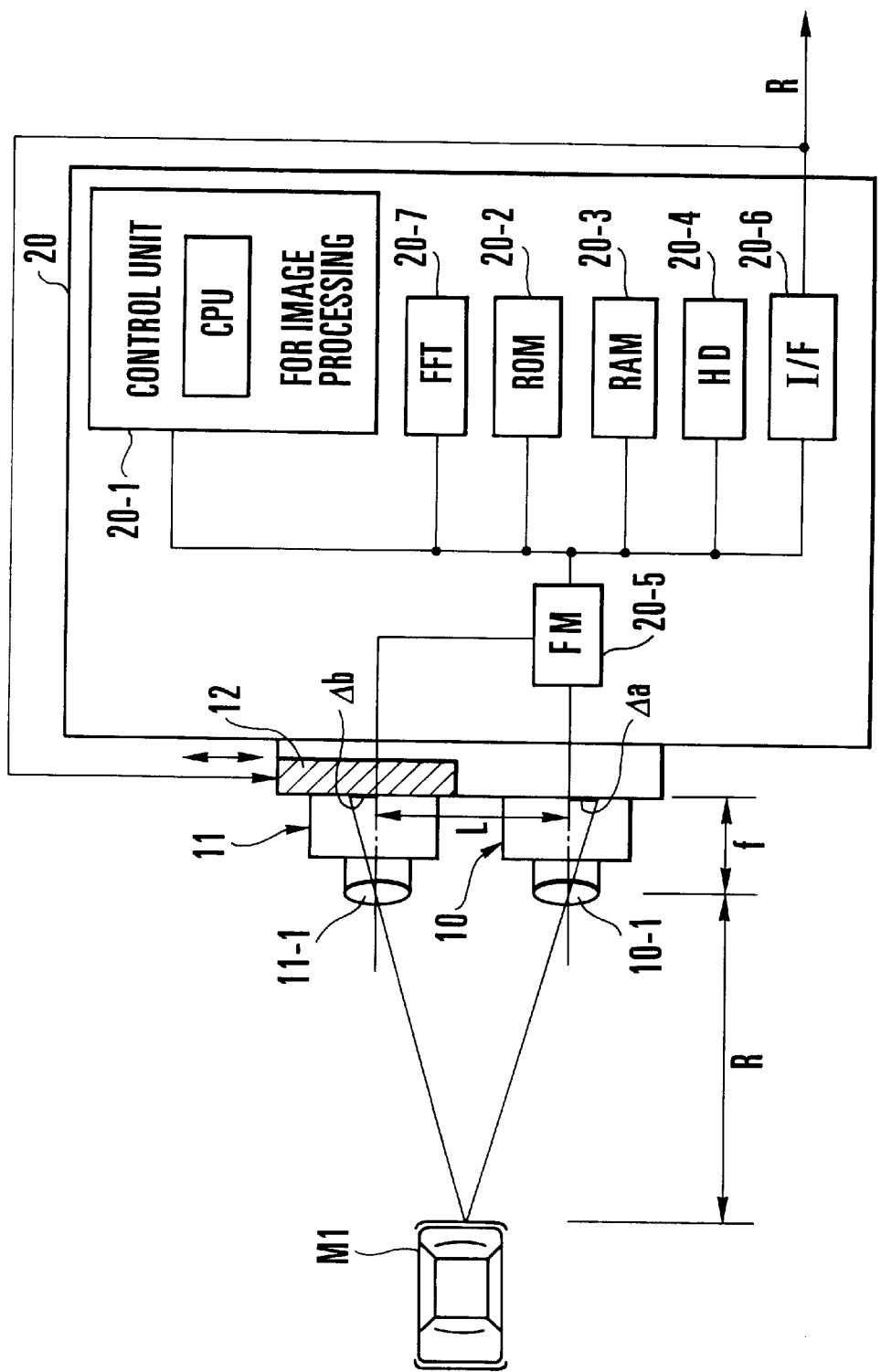
FIG. 5 is a block diagram showing the arrangement of a distance measuring device according to another embodiment of the present invention.
Figure 6:
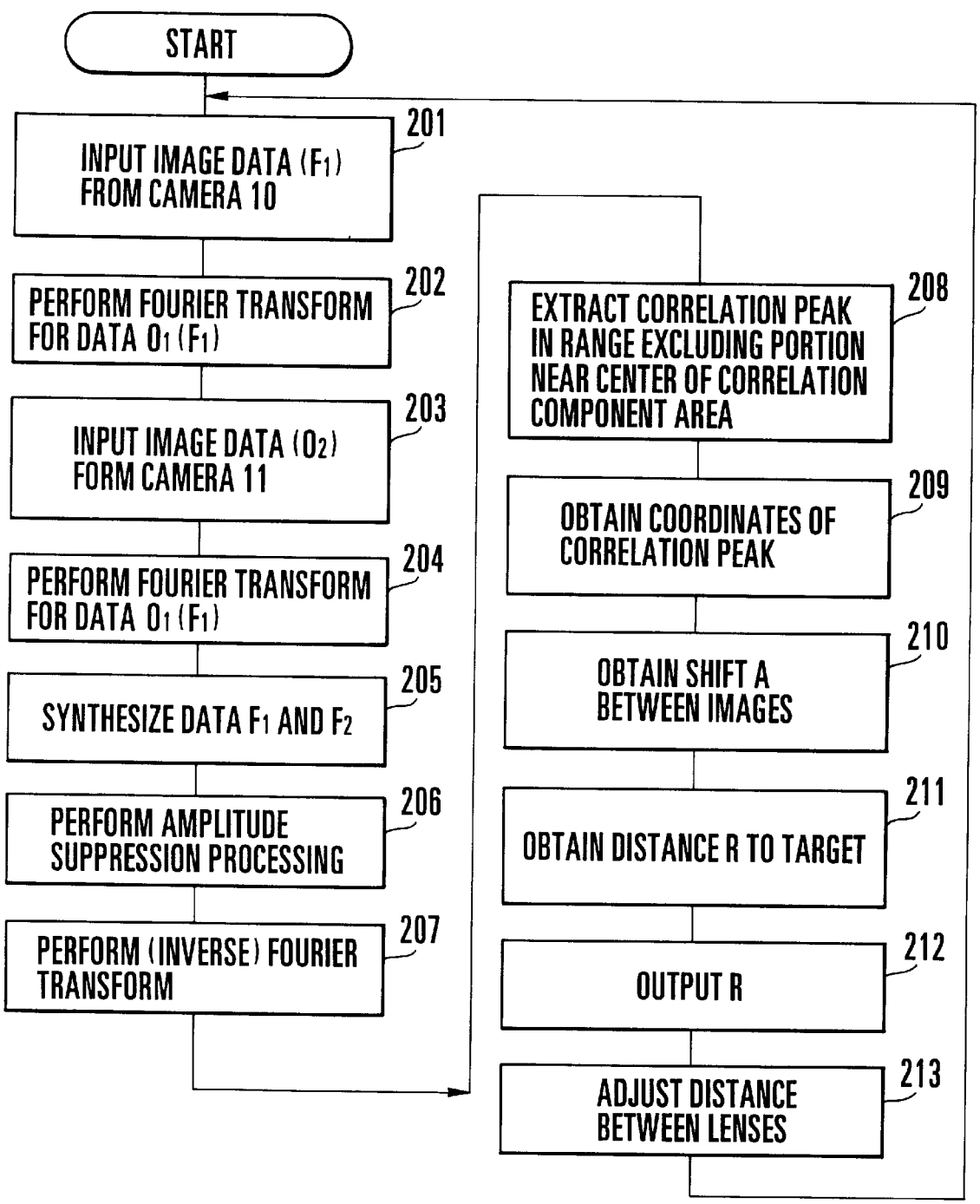
FIG. 6 is a flow chart for explaining a distance measuring operation in this distance measuring device.

Referring to FIG. 5, an inter-lens distance adjusting mechanism 12 is arranged for a CCD camera 11 to automatically adjust the position of the CCD camera 11, i.e., the position of a lens 11-1, through the inter-lens distance adjusting mechanism 12 such that an inter-lens distance L increases with an increase in a measurement distance R. In this embodiment, the flow chart of FIG. 6 is used in correspondence with FIG. 3.

In this embodiment, the CCD cameras 10 and 11 are arranged side by side in a horizontal direction. These cameras, however, may be arranged in arbitrary directions, e.g., a vertical direction and an oblique direction.

In this embodiment, CCD cameras are used as the cameras 10 and 11. These cameras, however, may be cameras with lenses or pinhole cameras (without lenses). A camera with a lens can pick up a brighter image than that picked up a pinhole camera. The image picked up by the camera with the lens, however, tends to be distorted.

In the above embodiment, referring to FIG. 1C, the entire area of the synthesized Fourier image data is set as a correlation component area, but a partial area may be set as a correlation component area. In this case, a correlation peak indicating the background appears at different positions depending on how a correlation component area is set. In this case, the position at which a correlation peak indicating the background is likely to appear is set as a reference position, and a correlation peak is extracted within a range excluding a portion near the reference position.

Embodiment 2: Distance Measuring Device (Sixth to Ninth Aspects)

Embodiment 2A: Individual Image Receiving Scheme (Sixth, Seventh, and Eighth Aspects)

Embodiment 2A-1

Figure 7:
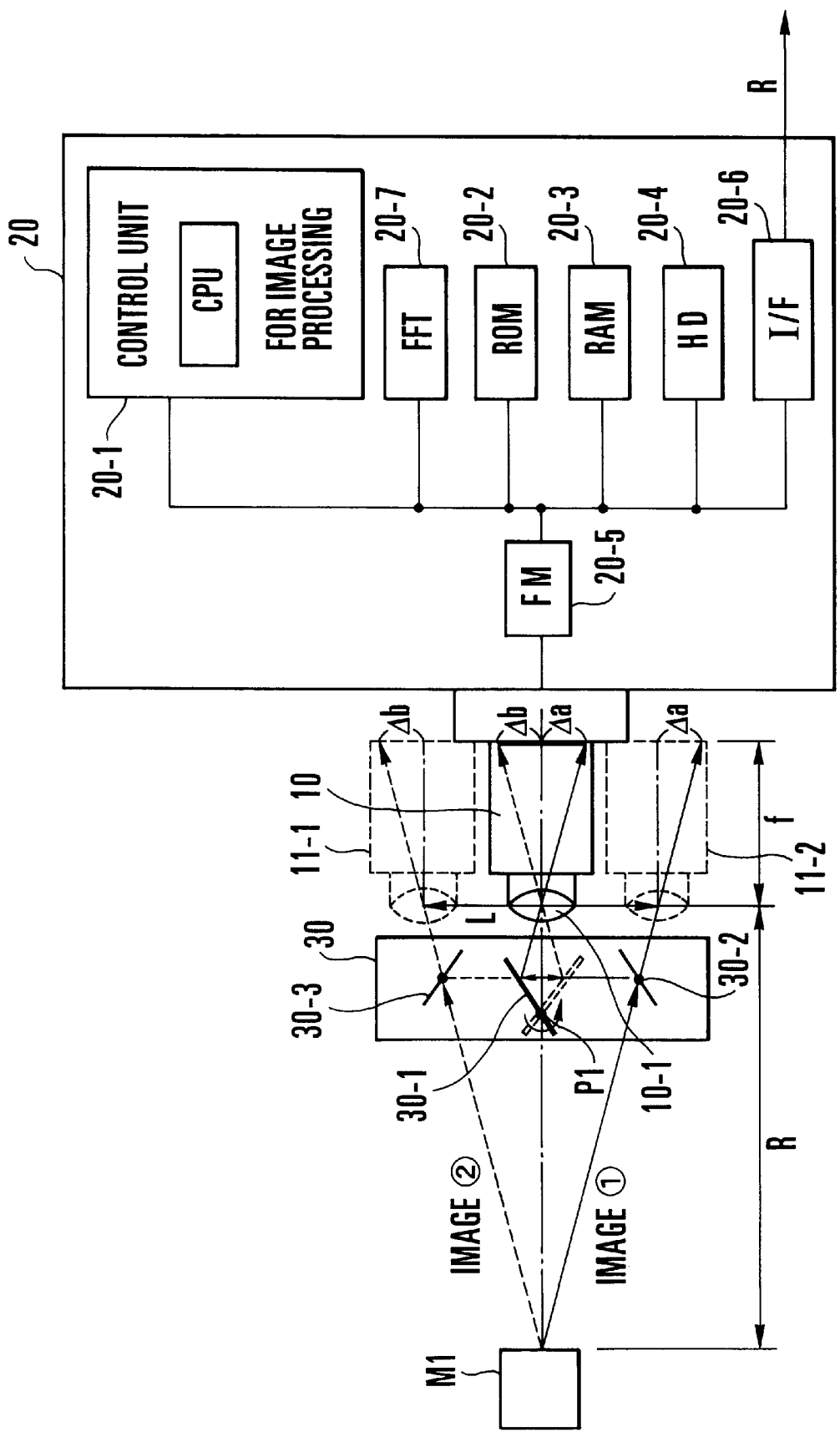
FIG. 7 is a block diagram showing the arrangement of a distance measuring device according to the present invention (sixth to ninth aspects)

FIG. 7 shows the arrangement of a distance measuring device according to the present invention. Referring to FIG. 7, reference numeral 10 denotes a CCD camera; 20, a processing section; and 30, an image receiving section. The processing section 20 includes a control section 20-1 having a CPU, a ROM 20-2, a RAM 20-3, a hard disk (HD) 20-4, a frame memory (FM) 20-5, an external connection section (I/F) 20-6, and a Fourier conversion section (FFT) 20-7. A distance measurement program (FIG. 9) is stored in the ROM 20-2. The image receiving section 30 includes a double-sided mirror 30-1 mounted on the optical axis of the front surface portion of the lens 10-1 of the CCD camera 10 to be rotatable about a support shaft P1, and one-sided mirrors 30-2 and 30-3 fixed on the two sides of the double-sided mirror 30-1 at predetermined tilt angles.

In this distance measuring device, a distance R to a target M1 is measured as follows.

In starting measurement, the rotational angle position of the mirror 30-1 is manually set to the position indicated by the solid line in FIG. 7, i.e., to the position where the center of the target M1 reflected in the mirror 30-2 is sensed by the image pickup section of the CCD camera 10.

Figure 8:
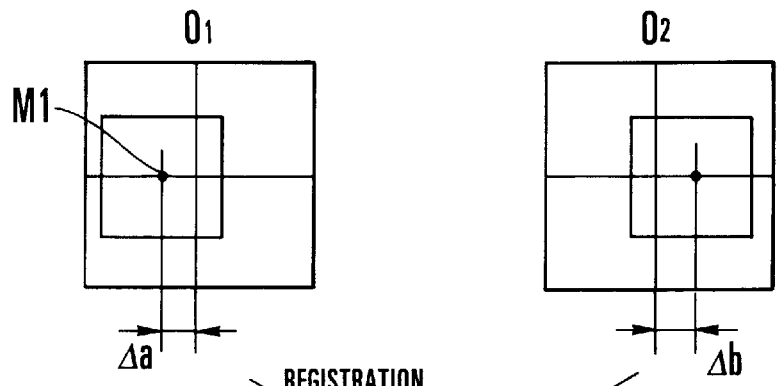
FIGS. 8A to 8D are views for explaining a distance measuring process in this distance measuring device.
Figure 8:
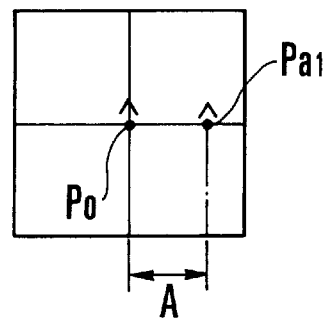
Figure 8:
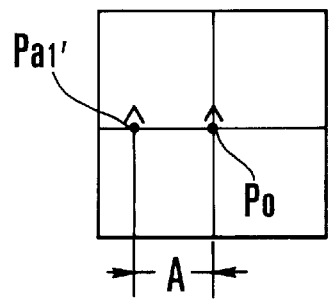
Figure 9:
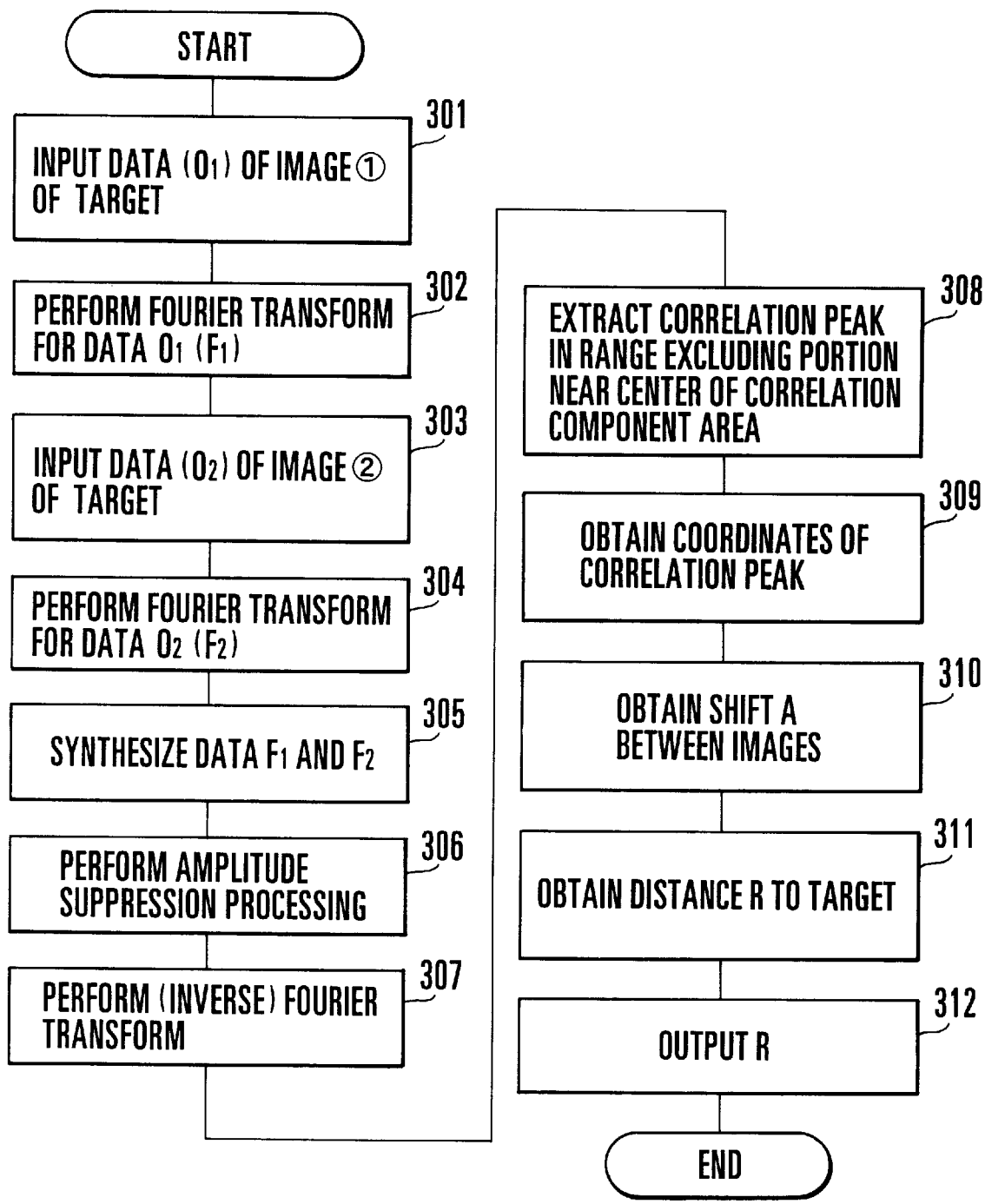
FIG. 9 is a flow chart for explaining a distance measuring operation in this distance measuring device.

In this state, the control section 20-1 sets an image of the target M1 (an image viewed from the first direction) picked up by the CCD camera 10 as an image ①, and loads image data $O_1$ of the image ① through the frame memory 20-5 (step 301 in FIG. 9). The control section 20-1 sets this loaded image data $O_1$ as registration image data (FIG. 8A), and sends this registration image data to the Fourier conversion section 20-7 to perform two-dimensional discrete Fourier transform (DFT) for the registration image data (step 302). With this operation, the registration image data $O_1$ in FIG. 8A becomes Fourier image data (registration Fourier image data) $F_1$.

Subsequently, the rotational angle position of the mirror 30-1 is manually set to the position indicated by the dotted line in FIG. 7, i.e., the position symmetrical with the position indicated by the solid line about the optical axis of the CCD camera 10. With this operation, the center of the target M1 reflected in the mirror 30-3 is sensed by the image pickup section of the CCD camera 10 at the opposite position to that in the above case.

In this state, the control section 20-1 sets an image of the target M1 (an image viewed from the second direction) picked up by the CCD camera 10 as an image ②, and loads image data $O_2$ of the image ② through the frame memory 20-5 (step 303). The control section 20-1 sets this loaded image data $O_2$ as collation image data (FIG. 8B), and sends this collation image data to the Fourier conversion section 20-7 to perform two-dimensional discrete Fourier transform (DFT) for the collation image data (step 304). With this operation, the collation image data $O_2$ in FIG. 8B becomes Fourier image data (collation Fourier image data) $F_2$.

The control section 20-1 then synthesizes the Fourier image data (registration Fourier image data) $F_1$ obtained in step 302 and the Fourier image data (collation Fourier image data) $F_2$ obtained in step 304 (step 305) to obtain synthesized Fourier image data.

Letting $A \cdot e^{j\theta}$ be the collation Fourier image data, and $B \cdot e^{j\phi}$ be the registration Fourier image data, this synthesized image data is represented by $A \cdot B \cdot e^{j(\theta-\phi)}$. The control section 20-1 then performs amplitude suppression processing for the synthesized Fourier image data obtained in this manner (step 306). In this embodiment, log processing is performed as amplitude suppression processing. More specifically, the log of $A \cdot B \cdot e^{j(\theta-\phi)}$, which is the mathematical expression of the above synthesized Fourier image data, is calculated as $\log(A \cdot B) \cdot e^{j(\theta-\phi)}$, thereby suppressing A.B representing the amplitude to $\log(A.B)$ ($A.B > \log(A.B)$).

The synthesized Fourier image data having undergone amplitude suppression processing is less susceptible to the illuminance difference between the case in which the registration data is obtained and the case in which the collation data is obtained. That is, by performing amplitude suppression processing, the spectrum intensity of each pixel is suppressed to cut extreme values. As a result, more information is made effective.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 306, the control section 20-1 sends the synthesized Fourier image data having undergone amplitude suppression processing to the Fourier transform section 20-7 to perform second two-dimensional discrete Fourier transform (DFT) for the image data (step 307).

The control section 20-1 loads the synthesized Fourier image data having undergone DFT, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in a range excluding a portion near the center of the correlation component area from this histogram (step 308), and obtains the coordinates of the extracted correlation peak (step 309).

FIG. 8C shows the coordinate position of the correlation peak at this time. Referring to FIG. 9E, reference symbol $P_{a1}$ denotes the position of the correlation peak; and $P_0$, the center of the correlation component area. In this case, the correlation peak $P_{a1}$ indicates the target M1. The distance from the center $P_0$ of the correlation component area to the position $P_{a1}$ of the correlation peak indicates a shift A ($A = \Delta a + \Delta b$) between the two images $O_1$ and $O_2$. Note that a correlation peak indicating the background appears near the center $P_0$ of the correlation component area.

The control section 20-1 obtains the shift A between the image data $O_1$ and $O_2$ from the coordinate position of the correlation peak $P_{a1}$ (step 310), and obtains a distance R to the target M1 by equation (3) based on the principle of triangular surveying using the obtained shift A (step 311). The control section 20-1 outputs the obtained distance R to the target M1 to the outside through the I/F 20-6 (step 312).

$$R = f \cdot L / A \qquad (3)$$

where f is the distance from the center of the lens 10-1 to an image pickup position, and L is the inter-lens distance when the CCD camera 10 is replaced with two CCD cameras 11-1 and 11-2.

As described above, according to the distance measuring device of this embodiment, the image data of the target M1 viewed from the first and second directions are collated with each other on the basis of the spatial frequency characteristics to obtain the distance to the target M1 as the collation result. In this scheme, the processing is simplified, and the distance to a target can be measured within a short period of time as compared with the conventional scheme.

In this embodiment, two-dimensional discrete Fourier transform is performed in the Fourier transform section 20-7. However, this processing may be performed in the control section 20-1. In addition, in the embodiment, two-dimensional discrete Fourier transform is performed in step 307 in FIG. 9. However, two-dimensional discrete inverse Fourier transform may be performed instead of two-dimensional discrete Fourier transform. That is, instead of two-dimensional discrete Fourier transform, two-dimensional discrete inverse Fourier transform may be performed for synthesized Fourier image data having undergone amplitude suppression processing. Quantitatively, no change in collation precision occurs whether two-dimensional discrete Fourier transform or two-dimensional discrete inverse Fourier transform is performed. Processing based on two-dimensional discrete inverse Fourier transform is disclosed in reference 1.

Figure 10A:
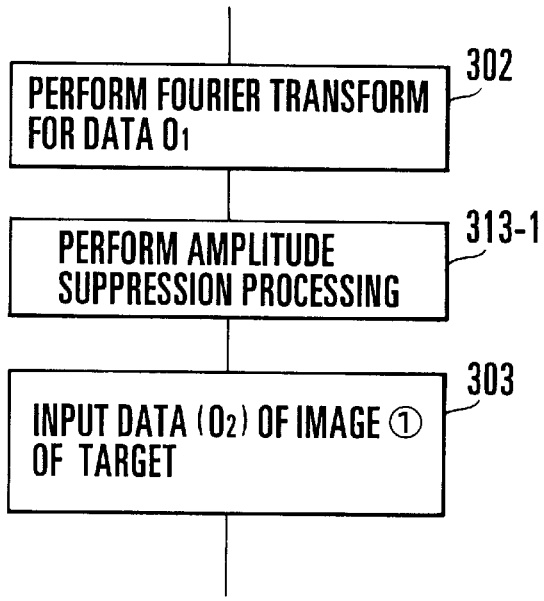
FIGS. 10A to 10C are flow charts for explaining other distance measuring operations in this distance measuring device.
Figure 10B:
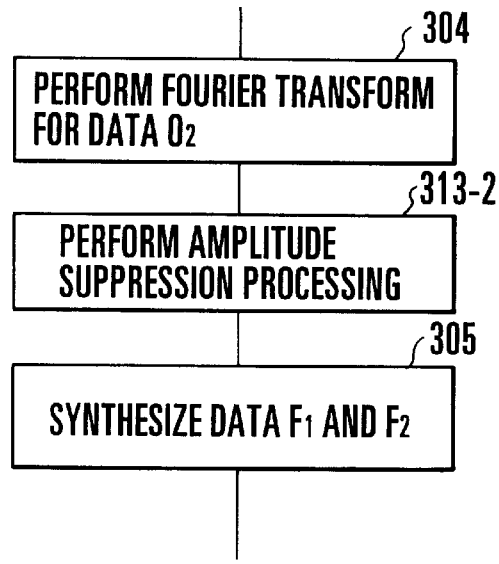
Figure 10C:
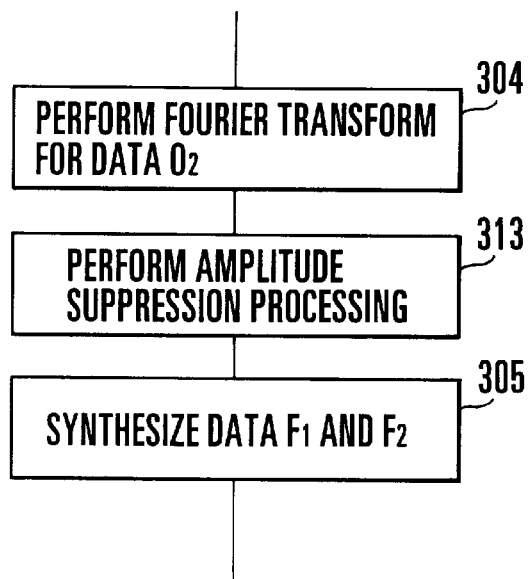

In this embodiment, amplitude suppression processing is performed first for synthesized Fourier image data, and two-dimensional discrete Fourier transform is then performed (steps 306 and 307). However, amplitude suppression processing may be performed for the registration and collation Fourier image data before synthesis, and the resultant data may be synthesized. More specifically, step 306 in FIG. 9 may be omitted, and steps 313-1 and 313-2 of performing amplitude suppression processing may be set between steps 302 and 303 and between steps 304 and 305, as shown in FIGS. 10A and 10B. Alternatively, as shown in FIG. 10C, step 306 in FIG. 9 may be omitted, and step 313 of separately performing amplitude suppression processing for the images $O_1$ and $O_2$ may be set between steps 304 and 305.

In this case, registration Fourier image data and collation Fourier image data having undergone amplitude suppression processing are obtained by amplitude suppression processing in step 313. Synthesized Fourier image data is obtained by synthesizing these Fourier image data.

In this case, the suppression ratio of the amplitude of the synthesized Fourier image data is low as compared with the case in which amplitude suppression processing is performed after synthesized Fourier image data is generated (FIG. 9). Therefore, the method of performing amplitude suppression processing after synthesized Fourier image data is generated (FIG. 9) is superior in collation precision to the method of generating synthesized Fourier image data after performing amplitude suppression processing (FIGS. 10A to 10C). In the case in which synthesized Fourier image data is generated after amplitude suppression processing is performed (FIG. 10A to 10C), two-dimensional discrete inverse Fourier transform may be performed for the synthesized Fourier image data instead of two-dimensional discrete Fourier transform.

In this embodiment, amplitude suppression processing is performed, but need not always be performed.

In this embodiment, the image data $O_1$ of the image viewed from the first direction is set as registration image data, and the image data $O_2$ of the image viewed from the second direction is set as collation image data. These data are then collated with each other on the basis of the spatial frequency characteristics to obtain the distance from the center of the correlation component area to the position of the correlation peak as the shift A between the two images. Even if, however, the image data $O_1$ of the image viewed from the first direction is set as collation image data, and the image data $O_2$ of the image viewed from the second direction is set as registration image data, the shift A between the two images can be obtained in the same manner as described above.

In this case, the data in FIG. 8D is obtained with respect to the data in FIG. 8C. That is, a correlation peak $P_{a1}'$ appears at the opposite position to the correlation peak $P_{a1}$ in FIG. 8D with respect to the center $P_0$ of the correlation area. In this case, therefore, the distance from the position of the correlation peak $P_{a1}'$ to the center $P_0$ of the correlation component area is obtained as the shift A between the two images.

Embodiment 2A-2

In Embodiment 2A-1 (FIG. 7), the mirrors 30-2 and 30-3 are arranged on the two sides of the mirror 30-1. As shown in FIG. 11, however, a cylindrical member 30' having only the mirror 30-2 for the mirror 30-1 may be arranged in this device to be rotated about the optical axis of the CCD camera 10 through 180°. In this arrangement, the mirror 30-3 used in Embodiment 1-1 can be omitted, and the mirror 30-1 may be a one-sided mirror.

Embodiment 2A-3

In Embodiment 2A-2 (FIG. 11), the cylindrical member 30' is designed to be rotated through 180°. With the arrangement shown in FIG. 12, however, the cylindrical member 30' need not be rotated through 180°. In this embodiment, a half mirror 30-1' is used in place of the mirror 30-1, and a mask 30-4 which is slidable in the direction indicated by the arrow in FIG. 12 is placed in front of the half mirror 30-1'. In this case, the images ① and ② are received by moving the mask 30-4.

In this case, however, the receiving route for the image ② is longer than that for the image ①, i.e., the picked-up image ② is smaller than the picked-up image ①. For this reason, the image ② is enlarged first and then subjected to the processing in step 304 and the subsequent steps in FIG. 9. The shift A between the two images is then obtained to obtain a distance R to a target M1 from the shift A according to equation (3).

Embodiment 2B: Simultaneous Image Receiving Scheme

Sixth, Seventh, and Eight Aspects

Embodiment 2A is suited for a case wherein a target is kept still. More specifically, according to Embodiment 2A, since the individual image receiving scheme is employed, the images ① and ② are picked up at different timings. If, therefore, the target moves or the image pickup environment changes with time, the device cannot accurately measure the distance to the target. In contrast to this, according to Embodiment 2, since the simultaneous image capturing scheme is employed, i.e., the images ① and ② are picked up at the same timing, even if the target moves or the image pickup environment changes with time, the device can measure the distance to the target.

Embodiment 2B-1

Figure 13:
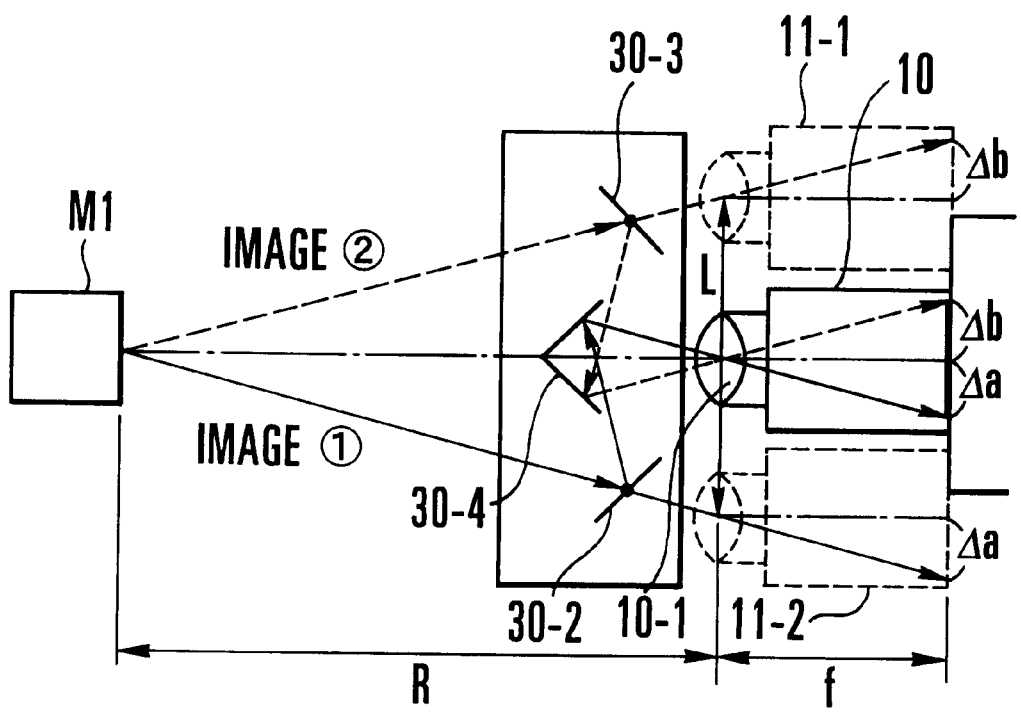
FIG. 13 is a view showing the main part of still another embodiment of the present invention.

FIG. 13 shows the main part of this embodiment. In the embodiment, a V-shaped one-sided mirror 30-4 is used in place of the double-sided mirror 30-1. In this case, images ① and ② are picked up at the same time. More specifically, the image (viewed from the first direction) ① of a sensed target M1 reflected in a mirror 30-2 and the image (viewed from the second direction) ② of the sensed target M1 reflected in a mirror 30-3 are picked up in an overlapping state by the image pickup section of the CCD camera 10 through the V-shaped mirror 30-4.

Figure 14:
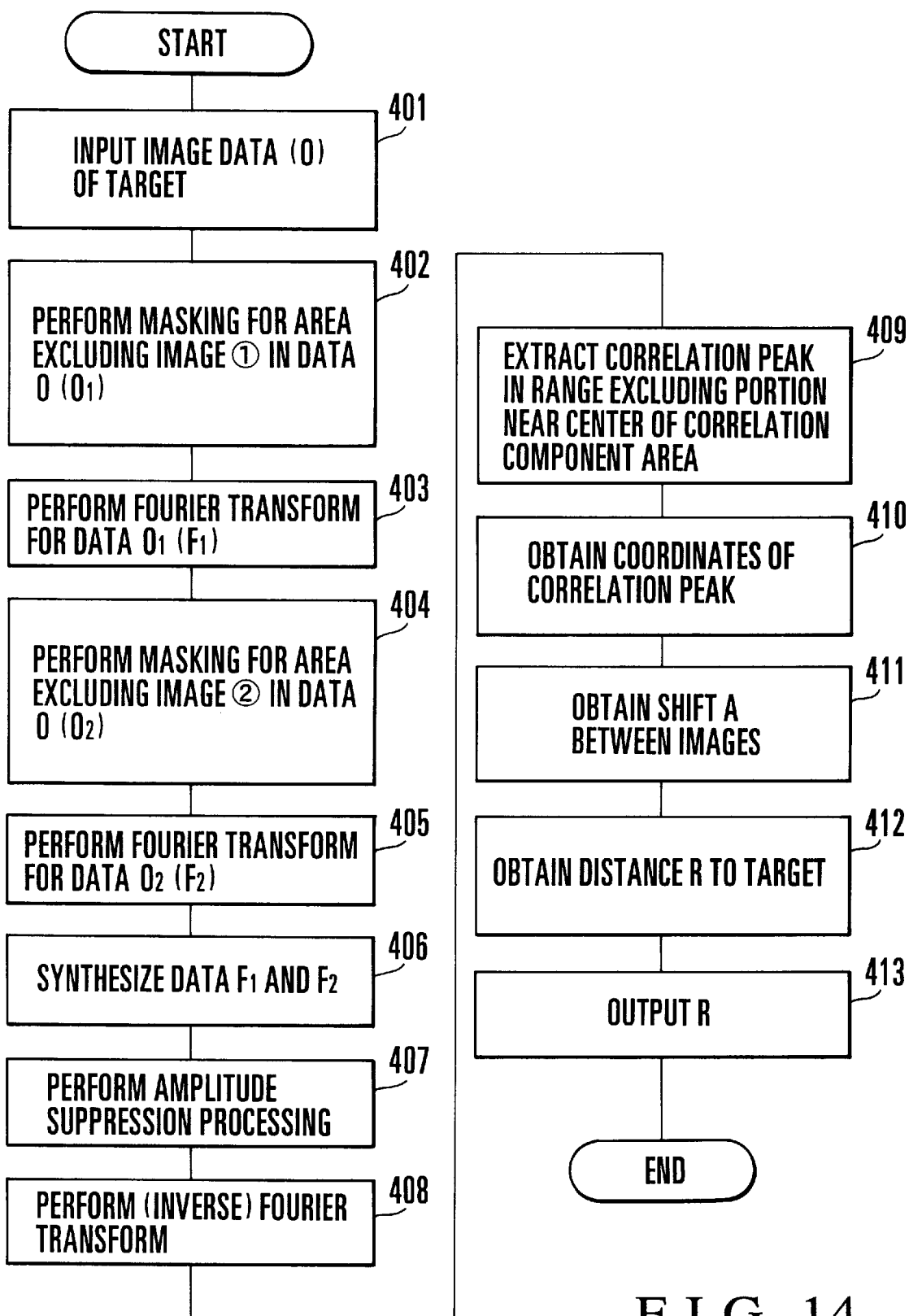
FIG. 14 is a flow chart for explaining a distance measuring operation in this distance measuring device.

A control section 20-1 loads image data O of the overlapping images ① and ② from the CCD camera 10 through a frame memory 20-5 (step 401 in FIG. 14). The control section 20-1 performs masking for an area of the loaded image O excluding the image ① (step 402), and sets the result image data as registration image data (FIG. 8A). The control section 20-1 sends this registration image data to a Fourier conversion section 20-7 to perform two-dimensional discrete Fourier transform (DFT) for the registration image data (step 403). With this processing, registration image data $O_1$ becomes Fourier image data (registration Fourier image data) $F_1$.

The control section 20-1 performs masking for an area of the loaded image O excluding the image ② (step 404), and sets the result image data as collation image data (FIG. 8B). The control section 20-1 sends this collation image data to the Fourier conversion section 20-7 to perform two-dimensional discrete Fourier transform (DFT) for the collation image data (step 405). With this processing, collation image data $O_2$ becomes Fourier image data (collation Fourier image data) $F_2$.

The control section 20-1 synthesizes the Fourier image data (registration Fourier image data) $F_1$ obtained in step 403 and the Fourier image data (collation Fourier image data) $F_2$ obtained in step 405 to obtain synthesized Fourier image data (step 406). The control section 20-1 performs amplitude suppression processing for the synthesized Fourier image data, and then performs second two-dimensional discrete Fourier transform for the synthesized Fourier image data having undergone the amplitude suppression processing (step 408).

The control section 20-1 loads the synthesized Fourier image data having undergone DFT, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in the correlation component area from this histogram (step 409), and obtains the coordinates of the extracted correlation peak (step 410).

FIG. 8C shows the coordinate position of the correlation peak at this time. Referring to FIG. 1C, reference symbol $P_{a1}$ denotes the position of the correlation peak; and $P_0$, the center of the correlation component area. In this case, the correlation peak $P_{a1}$ indicates the target M1. The distance from the center $P_0$ of the correlation component area to the position $P_{a1}$ of the correlation peak indicates a shift A (A=Δa+Δb) between the two image data $O_1$ and $O_2$. Note that a correlation peak indicating the background appears near the center $P_0$ of the correlation component area.

The control section 20-1 obtains the shift A between the image data $O_1$ and $O_2$ from the coordinate position of the correlation peak $P_{a1}$ (step 411), and obtains a distance R to the target M1 by equation (3) based on the principle of triangular surveying on the basis of the obtained shift A (step 412). The control section 20-1 outputs the obtained distance R to the target M1 to the outside through an I/F 20-6 (step 413).

Embodiment 2B-2

In Embodiment 2B-1 (FIG. 13), the V-shaped mirror 30-4 and the flat mirrors 30-2 and 30-3 are used. In contrast to this, in Embodiment 2B-2, as shown in FIG. 15, spherical mirrors 30-2', 30-3', and 30-4' are used. In this case, these members are designed and arranged such that images ① and ② are picked up by the image pickup section of a CCD camera 10 when a target M1 is at a distance R2 or more. According to this embodiment, the measurable range is wider than that in Embodiment 2B-1.

Embodiment 2B-3

Figure 16:
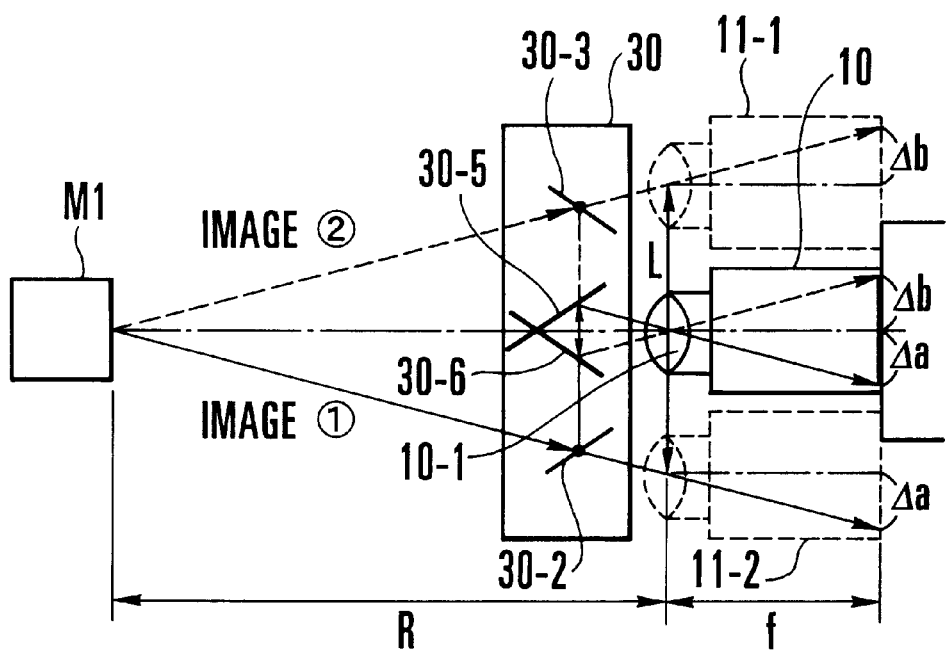
FIG. 16 is a view showing the main part of still another embodiment of the present invention.

In Embodiment 2B-1 (FIG. 13), the V-shaped mirror 30-4 is used. In this case, since the width of the image captured by the CCD camera 10 is small, an improvement in precision cannot be expected. In this embodiment, therefore, two mirrors 30-5 and 30-6 are arranged vertically to intersect each other, as shown in FIG. 16. That is, the mirrors 30-5 and 30-6 are placed at upper and lower positions, respectively, to intersect each other. In addition, mirrors 30-2 and 30-3 are arranged at upper and lower positions, respectively, in correspondence with the mirrors 30-5 and 30-6. With this arrangement, images of a target M1 are respectively reflected in the mirrors 30-5 and 30-6, and an overlapping image of images ① and ② is captured by the image pickup section of a CCD camera 10. In this case, since the width of the image is larger than that of the image received by using the V-shaped mirror 30-4, the precision improves.

Embodiment 2C (Ninth Aspect)

In Embodiments 2A and 2B described above, a CCD camera is used as the camera 10. This camera, however, may be a camera with a lens or a pinhole camera (without a lens). A camera with a lens can pick up a brighter image than a pinhole camera. The image picked up by the camera with the lens, however, tends to be distorted.

In the above embodiment, referring to FIG. 8C, the entire area of the synthesized Fourier image data is set as a correlation component area, but a partial area may be set as a correlation component area. In this case, a correlation peak indicating the background appears at different positions depending on how a correlation component area is set. In this case, the position at which a correlation peak indicating the background is likely to appear is set as a reference position, and a correlation peak is extracted within a range excluding a portion near the reference position.

Embodiment 3: Three-dimensional Image Measuring Apparatus

Figure 17:
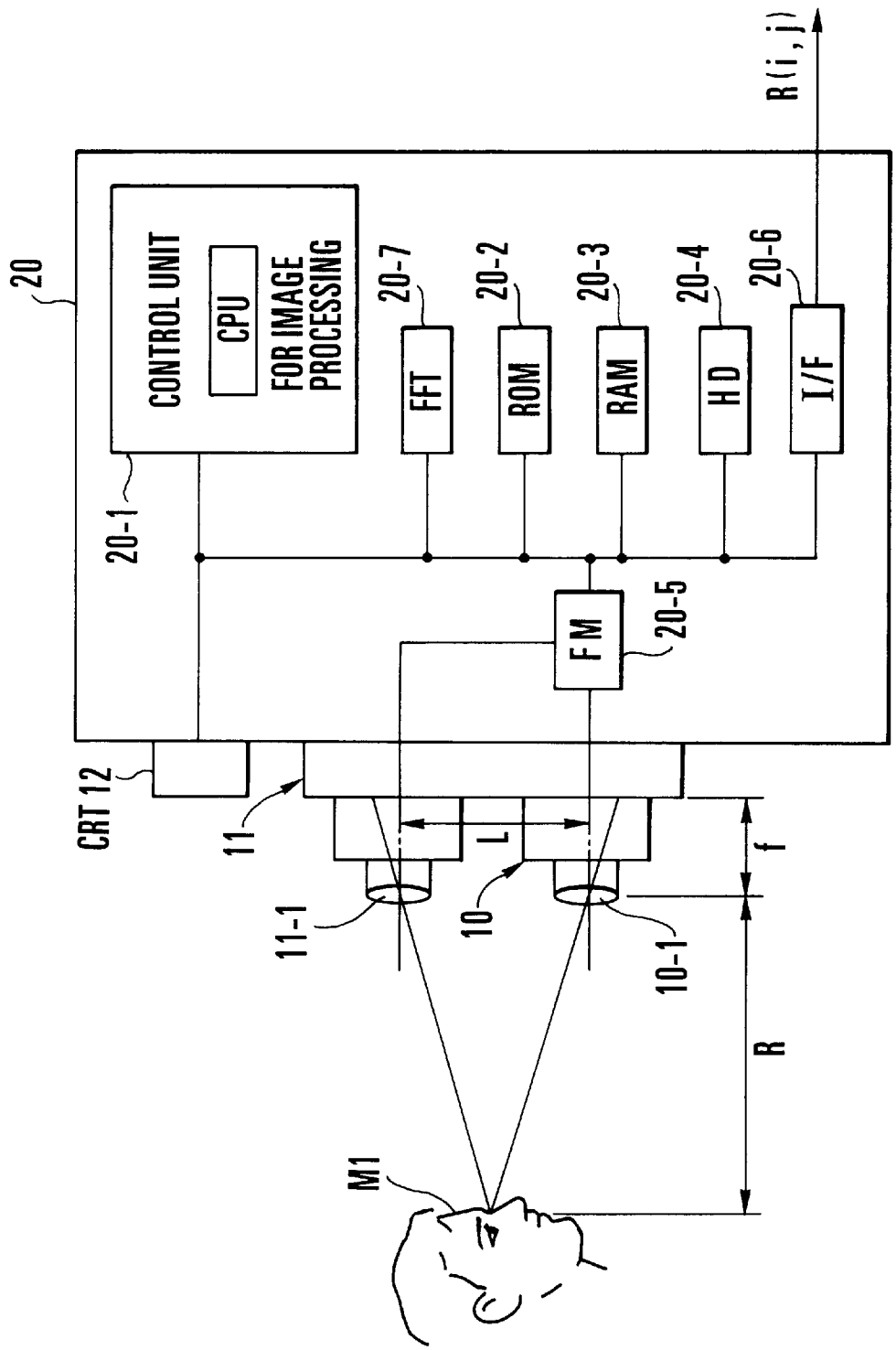
FIG. 17 is a block diagram showing the arrangement of a three-dimensional image measuring apparatus according to the present invention (10th to 15th aspects)

FIG. 17 shows the arrangement of a three-dimensional image measuring apparatus according to the present invention. Referring to FIG. 17, reference numeral 10 denotes a first CCD camera; 11, a second CCD camera; 12, a CRT; and 20, a processing section. The processing section 20 includes a control section 20-1 having a CPU, a ROM 20-2, a RAM 20-3, a hard disk (HD) 20-4, a frame memory (FM) 20-5, an external connection section (I/F) 20-6, and a Fourier conversion section (FFT) 20-7. A three-dimensional image measurement program (FIGS. 19 and 20) is stored in the ROM 20-2. The CCD cameras 10 and 11 are spaced apart from each other by a distance L. That is, the CCD cameras 10 and 11 are arranged side by side in the horizontal direction such that the distance L is ensured between lenses 10-1 and 11-1. For the sake of clarity, FIG. 17 shows a plan view of the three-dimensional image measuring apparatus, and a side of an object (human face).

Embodiment 3A: 10th, 11th, and 12th Aspects

In this three-dimensional image measuring apparatus, when an object to be measured is a human face M1, a three-dimensional image of the object M1 is measured as follows.

Figure 18A:
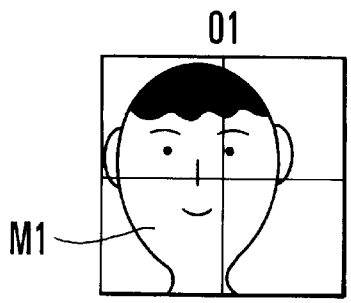
FIGS. 18A to 18F are views for explaining the process of measuring the distance from a camera to a local area in this three-dimensional image measuring apparatus.
Figure 18B:
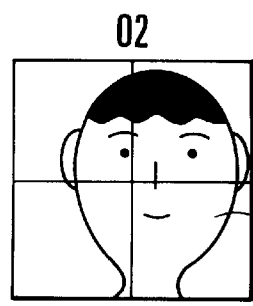
Figure 19:
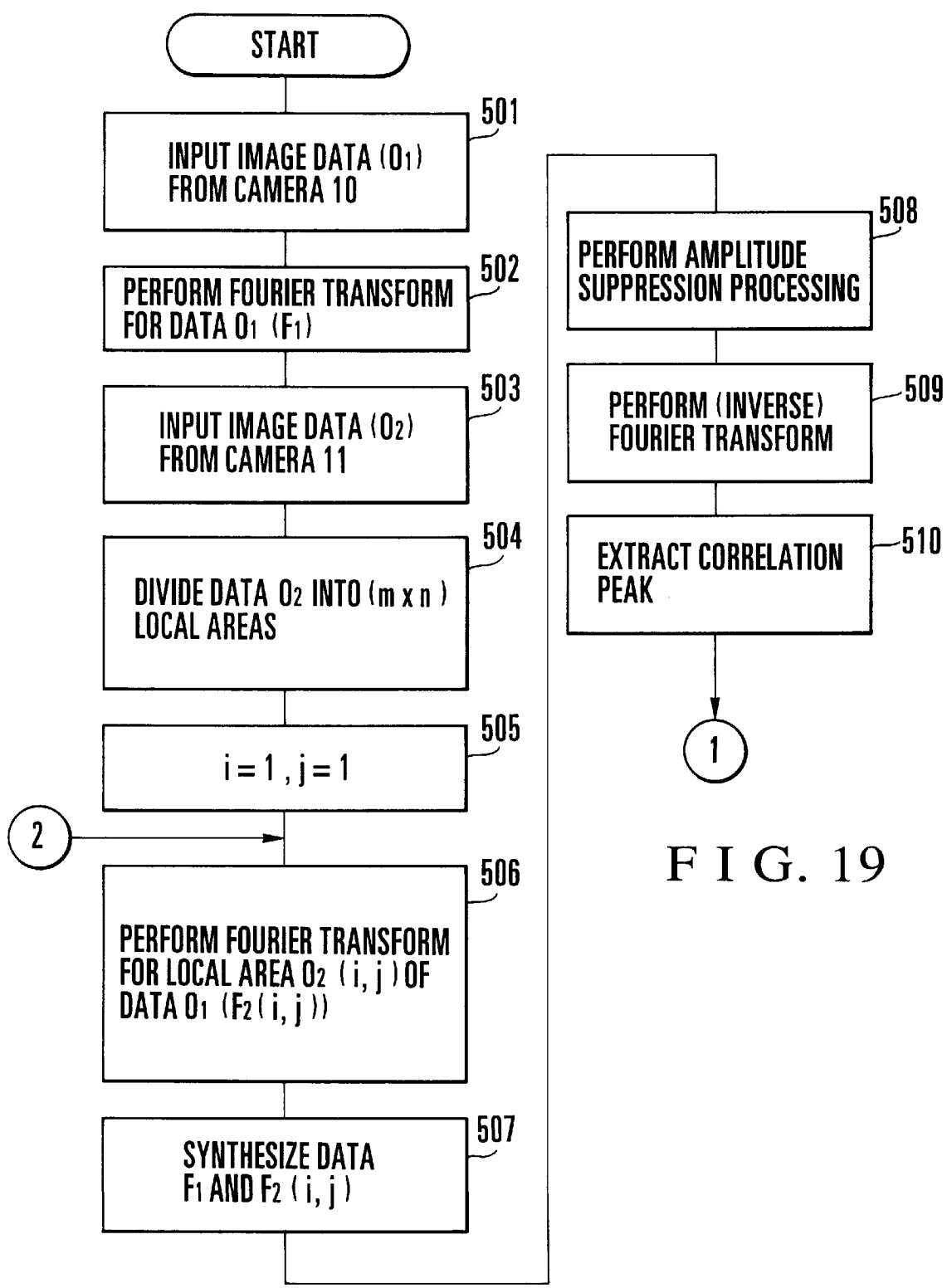
FIG. 19 is a flow chart for explaining a three-dimensional image measuring operation in this three-dimensional image measuring apparatus.

A control section 20-1 loads image data $O_1$ of the object M1 picked up by a CCD camera 10 through a frame memory 20-5 (step 501 in FIG. 19). The control section 20-1 sets this loaded image data $O_1$ as registration data (FIG. 18A), and sends this registration image data to a Fourier conversion section 20-7 to perform two-dimensional discrete Fourier transform (DFT) for the registration image data (step 502). With this processing, the registration image data $O_1$ shown in FIG. 18A becomes Fourier image data (registration Fourier image data) $F_1$.

Figure 18C:
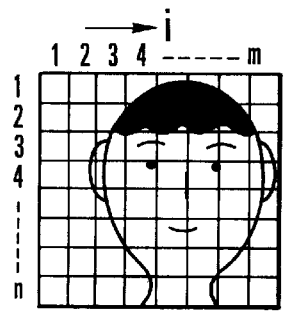

Subsequently, the control section 20-1 loads image data $O_2$ of the object M1 picked up by a CCD camera 11 through the frame memory 20-5 (step 503). The control section 20-1 divides this loaded image data $O_2$ into m×n local areas $O_2(i, j)$ (step 504 in FIG. 18C).

The control section 20-1 sets i=1 and j=1 (step 505), and sets the image data of a local area $O_2(i, j)$ of the image data $O_2$ as collation image data. The control section 20-1 sends this collation image data to the Fourier conversion section 20-7 to perform two-dimensional discrete Fourier transform (DFT) for the collation image data (step 506). With this processing, the image data of the local area $O_2(1, 1)$ becomes Fourier image data (collation Fourier image data) $F_2(1, 1)$.

The control section 20-1 then synthesizes the Fourier image data (registration Fourier image data) $F_1$ obtained in step 502 and the Fourier image data (collation Fourier image data) $F_2(1, 1)$ obtained in step 506 (step 507) to obtain synthesized Fourier image data.

Letting $A.e^{j\theta}$ be the collation Fourier image data, and $B.e^{j\phi}$ be the registration Fourier image data, this synthesized image data is represented by $A.B.e^{j(\theta-\phi)}$. The control section 20-1 then performs amplitude suppression processing for the synthesized Fourier image data obtained in this manner (step 508). In this embodiment, log processing is performed as amplitude suppression processing. More specifically, the log of $A.B.e^{j(\theta-\phi)}$, which is the mathematical expression of the above synthesized Fourier image data, is calculated as $\log(A.B).e^{j(\theta-\phi)}$, thereby suppressing A.B representing the amplitude to log(A.B) (A.B>log(A.B)).

The synthesized Fourier image data having undergone amplitude suppression processing is less susceptible to the illuminance difference between the case in which the registration data is obtained and the case in which the collation data is obtained. That is, by performing amplitude suppression processing, the spectrum intensity of each pixel is suppressed to cut extreme values. As a result, more information is made effective.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 508, the control section 20-1 sends the synthesized Fourier image data having undergone amplitude suppression processing to the Fourier transform section 20-7 to perform second two-dimensional discrete Fourier transform (DFT) for the image data (step 509).

The control section 20-1 loads the synthesized Fourier image data having undergone DFT, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in a range excluding a portion near the center of the correlation component area from this histogram, and obtains the coordinates of the extracted correlation peak (step 510).

Figure 20:
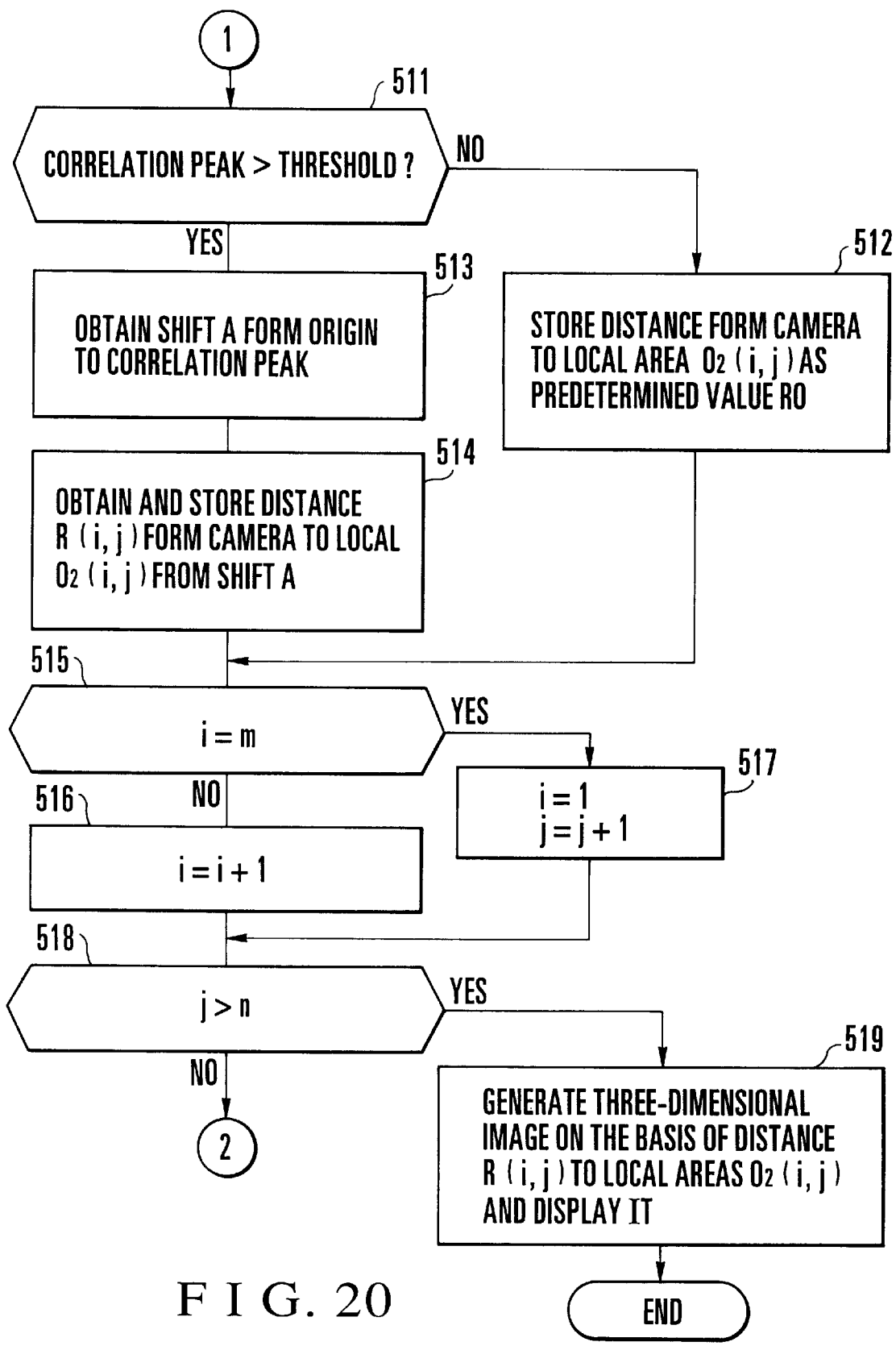
FIG. 20 is a flow chart for explaining a three-dimensional image measuring operation in this three-dimensional image measuring apparatus.

The control section 20-1 compares the extracted correlation peak with a threshold (step 511 in FIG. 20). If the correlation peak is equal to or smaller than the threshold, the flow advances to step 512. If the correlation peak is larger than the threshold, the flow advances to step 513. In this case, since there is no image data which coincides with the image data of the local area $O_2(1, 1)$ in the image data $O_1$, (or even if there is image data which coincides it, the image data is background data and appears as data having a small correlation peak), NO is obtained in step 511, and the flow advances to step 512. In step 512, a distance R(1, 1) from the camera (the center of a lens 10-1 or 11-1) to the local area $O_2(1, 1)$ of the object M1 is set and stored as a predetermined value R0.

In step 515, the control section 20-1 checks whether i=m. Thereafter, in step 516, the control section 20-1 sets i=i+1, i.e., i=2. The flow then returns to step 506 through step 518. Subsequently, the same operation is repeated to store distances R(2, 1) and R(3, 1) to local areas $O_2(2, 1)$ and $O_2(3, 1)$ of the object M1 as predetermined values R0.

When i=4 is set in step 516, the correlation peak becomes larger than the threshold in step 511. In this case, since there is image data which coincides with the image data (FIG. 18F) of a local area $O_2(4, 1)$ in the image data $O_1$, the correlation peak extracted from the correlation area at this time becomes larger than the threshold.

Figure 18D:
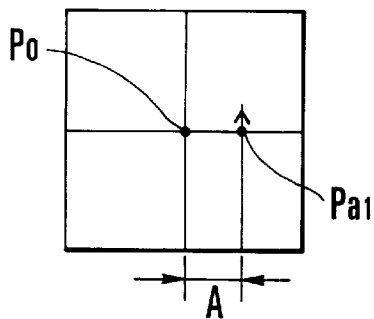
Figure 18F:
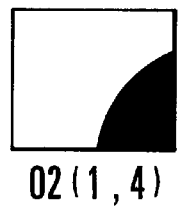

FIG. 18D shows the coordinate position of the correlation peak at this time. Referring to FIG. 18D, reference symbol $P_{a1}$ denotes the position of the correlation peak; and $P_0$, the center of the correlation component area. In this case, the correlation peak $P_{a1}$ indicates the local area $O_2$, and a distance A from the center $P_0$ of the correlation component area to the position $P_{a1}$ of the correlation peak indicates the shift between the local area $O_2(4, 1)$ in the image data $O_2$ and the area, in the image data $O_1$, in which the image data which coincides with the local area $O_2(4, 1)$ is present.

In this case, the control section 20-1 obtains the distance A from the center $P_0$ of the correlation component area to the collation peak $P_{a1}$ (step 513) to obtain the shift A between the local area $O_2(4, 1)$ in the image data $O_2$ and the area, in the image data $O_1$, in which the image data which coincides with the local area $O_2(4, 1)$ is present. The control section 20-1 then obtains a distance R(4, 1) from the camera to the local area $O_2(4, 1)$ of the object M1 by equation (2) based on the principle of triangular surveying using the obtained shift, and stores it (step 514). In this case, the distance R(4, 1) is obtained as the average distance to the local area $O_2(4, 1)$ of the object M1.

In step 515, the control section 20-1 checks whether i=m. In step 516, the control section 20-1 sets i=i+1, i.e., i=5. The flow then returns to step 506 through step 518. Subsequently, the same operation as described above is repeated. If the correlation peak extracted from the correlation component area is smaller than the threshold, the distance to the local area $O_2(i, j)$ of the object M1 at this time is stored as a predetermined value R0. If the correlation peak is larger than the threshold, the control section 20-1 stores the distance to the local area (i, j) of the target M1 as a distance R(i, j) obtained from the shift A.

If it is determined in step 515 that i=m, i=1 and j=i+1 are set (step 517). The flow then returns to step 506 through step

518. If it is determined that j>n, it is determined that distances R(i, j) to all local areas (i, j) have been obtained. The flow then advances to step 519. In step 519, a three-dimensional image is formed on the basis of the distances R(i, j) to the local areas $O_2$(i, j) of the object M1 which are obtained in the repetitive processing in steps 501 to 518. The image is then displayed on the CRT 12. If wire frame display, i.e., line drawing display, is performed in this case, a more stereoscopic image can be obtained.

As described above, according to the three-dimensional image measuring apparatus of this embodiment, the image of the object M1 viewed from the first direction and the image data of the object M1 viewed from the second direction are collated with each other on the basis of the spatial frequency characteristics to obtain a three-dimensional image of the object M1 as the collation result. With this operation, a three-dimensional image of an even moving object can be measured at a high speed and a low cost.

In this embodiment, two-dimensional discrete Fourier transform is performed in the Fourier transform section 20-7. However, this processing may be performed in the control section 20-1. In addition, in the embodiment, two-dimensional discrete Fourier transform is performed in step 509 in FIG. 19. However, two-dimensional discrete inverse Fourier transform may be performed instead of two-dimensional discrete Fourier transform. That is, instead of two-dimensional discrete Fourier transform, two-dimensional discrete inverse Fourier transform may be performed for synthesized Fourier image data having undergone amplitude suppression processing. Quantitatively, no change in collation precision occurs whether two-dimensional discrete Fourier transform or two-dimensional discrete inverse Fourier transform is performed. Processing based on two-dimensional discrete inverse Fourier transform is disclosed in reference 1.

Figures 21A, 21B:
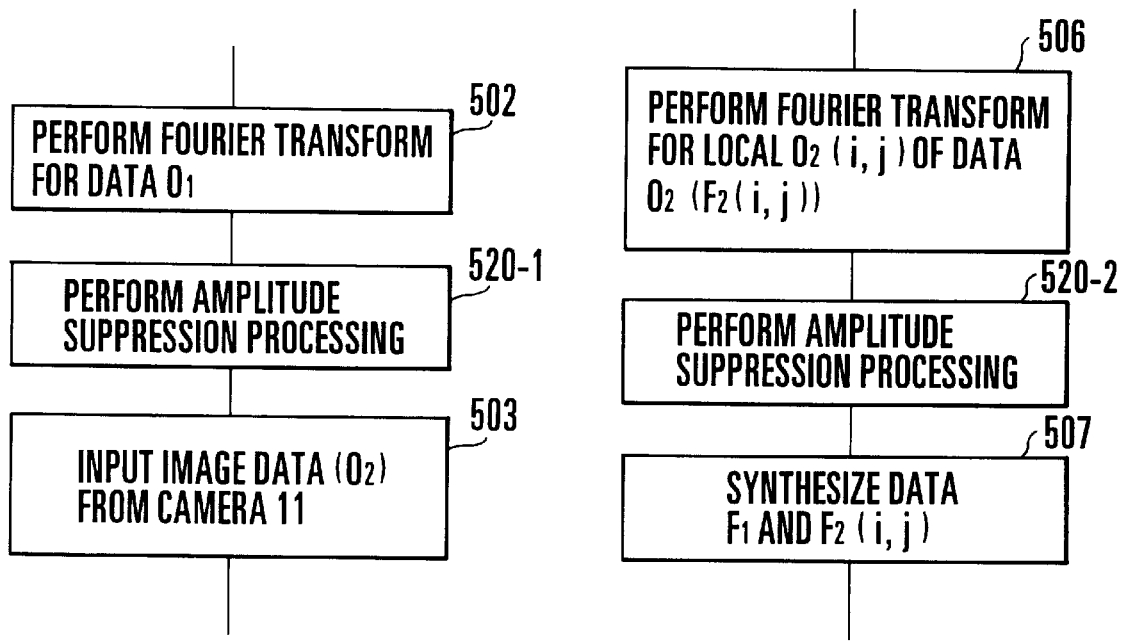
FIGS. 21A to 21C are flow charts for explaining other three-dimensional image measuring operations in this three-dimensional image measuring apparatus.
Figure 21C:
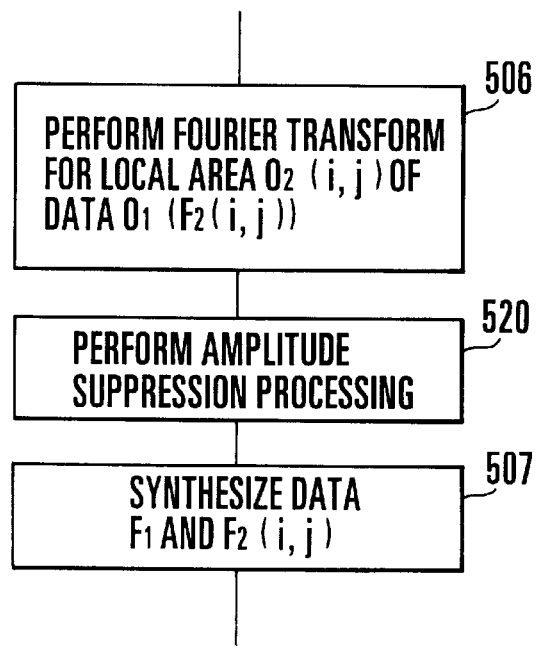

In this embodiment, amplitude suppression processing is performed first for synthesized Fourier image data, and two-dimensional discrete Fourier transform is then performed (steps 508 and 509). However, amplitude suppression processing may be performed for the registration and collation Fourier image data before synthesis, and the resultant data may synthesized. More specifically, step 508 in FIG. 19 may be omitted, and steps 520-1 and 520-2 of performing amplitude suppression processing may be set between steps 502 and 503 and between steps 506 and 507, as shown in FIGS. 21A and 21B. Alternatively, as shown in FIG. 21C, step 508 in FIG. 19 may be omitted, and step 520 of separately performing amplitude suppression processing for the image data $F_1$ and $F_2$(i, j) may be set between steps 506 and 507.

In this case, registration Fourier image data and collation Fourier image data having undergone amplitude suppression processing are obtained by amplitude suppression processing in step 520. Synthesized Fourier image data is obtained by synthesizing these Fourier image data.

In this case, the suppression ratio of the amplitude of the synthesized Fourier image data is low as compared with the case in which amplitude suppression processing is performed after synthesized Fourier image data is generated (FIG. 19). Therefore, the method of performing amplitude suppression processing after synthesized Fourier image data is generated (FIG. 19) is superior in collation precision to the method of generating synthesized Fourier image data after performing amplitude suppression processing (FIGS. 21A to 21C). In the case in which synthesized Fourier image data is generated after amplitude suppression processing is performed (FIGS. 21A to 21C), two-dimensional discrete inverse Fourier transform may be performed for the synthesized Fourier image data instead of two-dimensional discrete Fourier transform.

In this embodiment, amplitude suppression processing is performed, but need not always be performed.

In this embodiment, the image data $O_1$ of the object M1 viewed from the first direction is set as registration image data, and the image data of the local area $O_2$(i, j) of the image data $O_2$ of the object M1 viewed from the second direction is set as collation image data. These data are then collated with each other on the basis of the spatial frequency characteristics to obtain the distance from the center of the correlation component area to the position of the correlation peak as the shift A. Even if, however, the image data $O_1$(i, j) of the object M1 viewed from the first direction is set as collation image data, and the image data $O_2$ of the object M1 viewed from the second direction is set as registration image data, the shift A can be obtained in the same manner as described above.

Figure 18E:
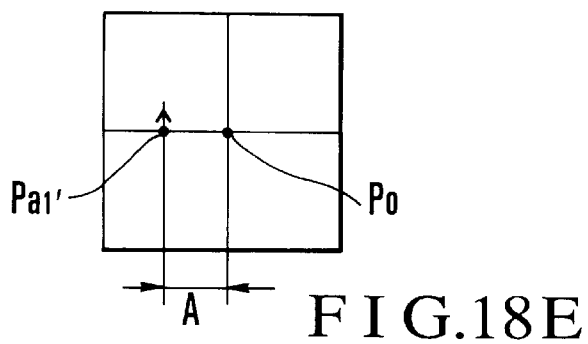

In this case, the data in FIG. 18E is obtained with respect to the data in FIG. 18D. That is, a correlation peak $P_{a1}'$ appears at the opposite position to the correlation peak $P_{a1}$ in FIG. 18D with respect to the center $P_0$ of the correlation area. In this case, therefore, the distance from the position of the correlation peak $P_{a1}'$ to the center $P_0$ of the correlation component area is obtained as the shift A.

Embodiment 3B: 13th, 14th, and 15th Aspects

In Embodiment 3A, the image data $O_1$ of the object M1 viewed from the first direction is set as registration image data, and DFT is performed for this registration image data to form the registration Fourier image data $F_1$. This registration Fourier image data $F_1$ is then synthesized with the collation Fourier image data $F_2$(i, j) formed by performing DFT for the image data of the local area $O_2$(i, j) of the image data $O_2$ of the object M1 viewed from the second direction. The shift A is obtained from the resultant synthesized Fourier image data. In this case, since the collation Fourier image data $F_1$(i, j) of each local area $O_2$(i, j) is synthesized with the registration Fourier image data $F_1$ of the entire image data $O_1$, the computation amount is large.

Figure 22A:
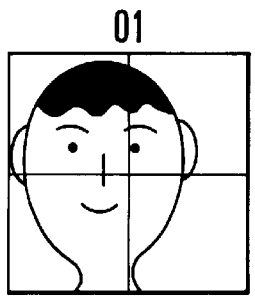
FIGS. 22A to 22G are views for explaining the process of measuring the distance from a camera to a local area in the three-dimensional image measuring apparatus in FIG. 17.
Figure 22B:
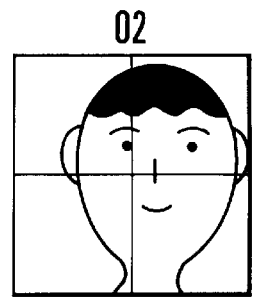
Figure 22G:
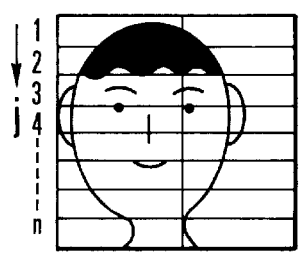
Figure 22C:
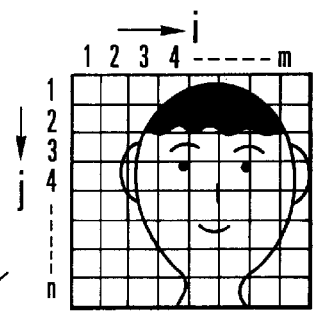
Figure 22D:
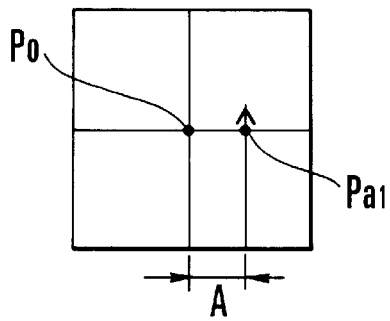
Figure 22F:
Figure 22E:
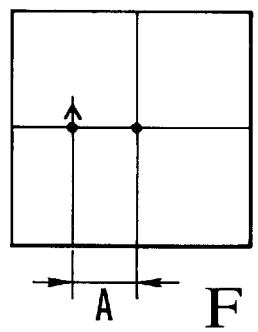
Figure 23:
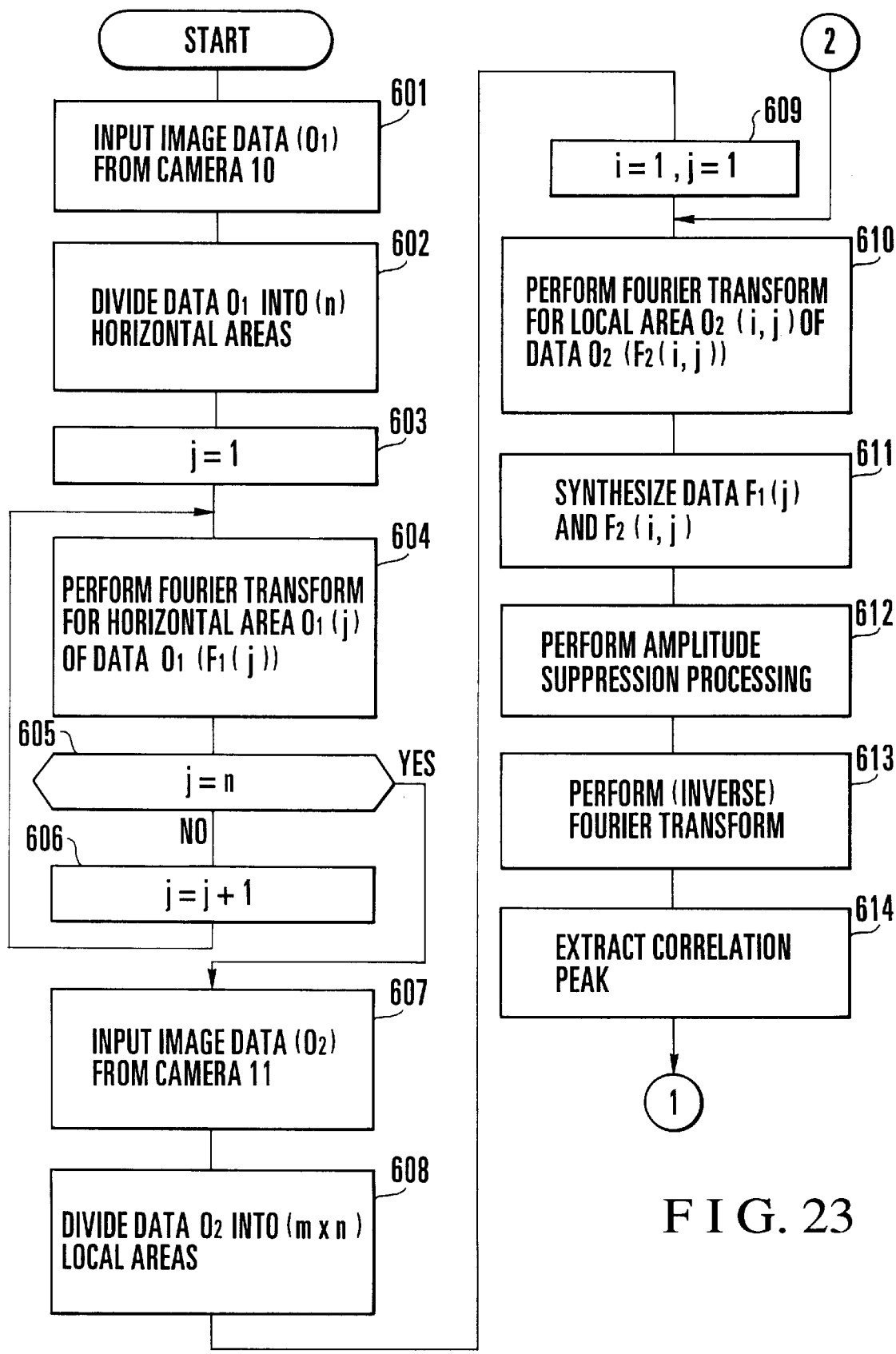
FIG. 23 is a flow chart for explaining a three-dimensional image measuring operation in this three-dimensional image measuring apparatus.

In Embodiment 3B, therefore, to decrease the computation amount, the following processing is performed. First of all, the image data $O_1$ of the object M1 viewed from the first direction is divided in the horizontal direction (see FIG. 22G). DFT is then performed for each divided area $O_1$(j) to form registration Fourier image data F,(j). The collation Fourier image data $F_2$(i, j) is synthesized with the registration Fourier image data $F_1$(j) of the divided area belonging to an area $O_1$(i, j) of the image data $O_1$ which corresponds to the local area $O_2$(i, j). The shift A is obtained from the resultant synthesized Fourier image data. FIGS. 23 and 24 show flow charts for this processing.

In Embodiment 3B, the image $O_1$ is divided in the horizontal direction. This data, however, may be divided in the vertical direction.

Figure 25:
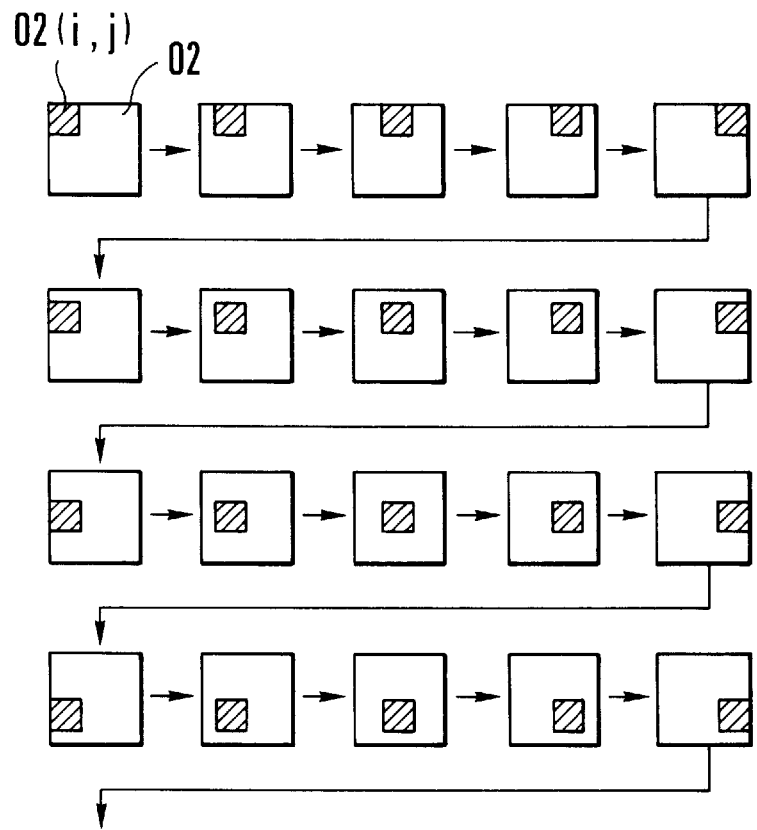
FIG. 25 is a view for explaining another method of extracting a local area from image data $O_1$.

In Embodiments 3A and 3B, the local areas $O_2$(i, j) are cut from the image data $O_2$. As shown in FIG. 25, however, local areas may be cut from the image data while the image is shifted little by little (e.g., pixel by pixel). That is, the local areas $O_2$(i, j) may be cut in an overlapping state. With this operation, the measuring precision can be improved.

In Embodiments 3A and 3B, the CCD cameras 10 and 11 are arranged side by side in the horizontal direction. These cameras, however, may be arranged in arbitrary directions, e.g., a vertical direction and an oblique direction.

Embodiment 3C In Embodiments 3A and 3B, the two CCD cameras are used. The present invention, however, can be implemented by one CCD camera.

Embodiment 3C-A: Individual Image Receiving Scheme

Embodiment 3C-A1

Figure 26:
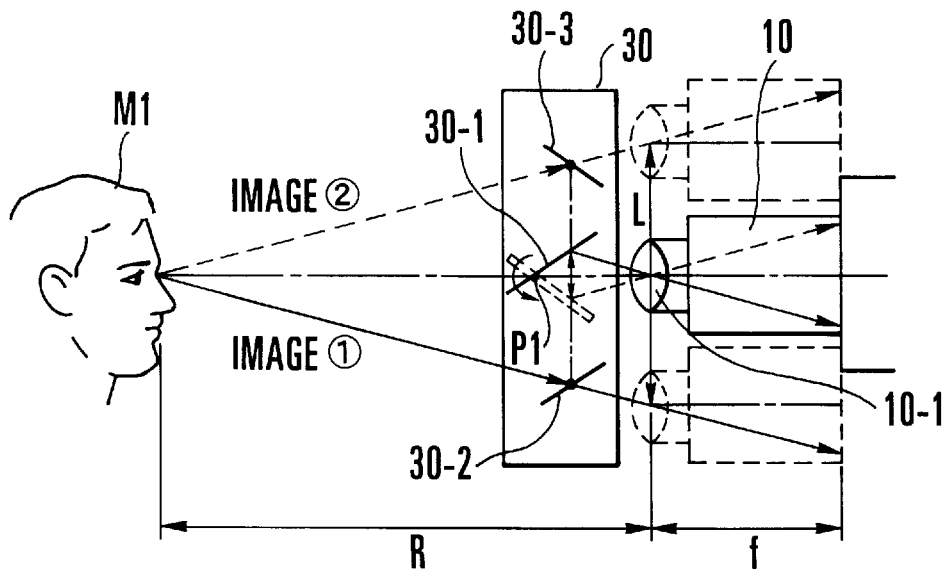
FIG. 26 is a view showing the main part of an arrangement implementing three-dimensional image measurement with one camera.

FIG. 26 shows the main part of an arrangement using only one CCD camera 10. In this case, as in the case shown in FIG. 7, an image receiving section 30 is placed at the front surface portion of the CCD camera 10. This image receiving section 30 includes a double-sided mirror 30-1 mounted on the optical axis of the front surface portion of a lens 10-1 of the CCD camera 10 to be rotatable about a support shaft P1, and one-sided mirrors 30-2 and 30-3 fixed on the two sides of the double-sided mirror 30-1 at predetermined tilt angles.

In starting measurement, the rotational angle position of the mirror 30-1 is manually set to the position indicated by the solid line in FIG. 26, i.e., to the position where the center of a target M1 reflected in the mirror 30-2 is sensed by the image pickup section of the CCD camera 10. In this state, a control section 20-1 sets an image of the sensed target M1 (an image viewed from the first direction) from the CCD camera 10 as an image ①, and loads image data $O_1$ of the image ① through the frame memory 20-5.

Subsequently, the rotational angle position of the mirror 30-1 is manually set to the position indicated by the dotted line in FIG. 26, i.e., the position symmetrical with the position indicated by the solid line about the optical axis of the CCD camera 10. With this operation, the center of the target M1 reflected in the mirror 30-3 is sensed by the image pickup section of the CCD camera 10 at the opposite position to that in the above case. In this state, the control section 20-1 sets an image of the sensed target M1 (an image viewed from the second direction) from the CCD camera 10 as an image ②, and loads image data $O_2$ of the image ② through the frame memory 20-5.

Embodiment 3C-A2

In Embodiment 3C-A1 (FIG. 16), the mirrors 30-2 and 30-3 are arranged on the two sides of the mirror 30-1. As in the case shown in FIG. 11, however, a cylindrical member 30' having only the mirror 30-2 for the mirror 30-1 may be arranged in this device to be rotated about the optical axis of the CCD camera 10 through 180°, as shown in FIG. 27. In this arrangement, the mirror 30-3 used in Embodiment 1-1 can be omitted, and the mirror 30-1 may be a one-sided mirror.

Embodiment 3C-A3

In Embodiment 3C-A2 (FIG. 27), the cylindrical member 30' is designed to be rotated through 180°. With the arrangement shown in FIG. 28, however, the cylindrical member 301 need not be rotated through 180° as in the case shown in FIG. 12. In this embodiment, a half mirror 30-1' is used in place of the mirror 30-1, and a mask 30-4 which is slidable in the direction indicated by the arrow in FIG. 12 is placed in front of the half mirror 30-1'. In this case, the images ① and ② are received by moving the mask 30-4.

In this case, however, the receiving route for the image ② is longer than that for the image ①, i.e., the picked-up image ② is smaller than the picked-up image ①. For this reason, the image $O_2$ is enlarged first and then subjected to the processing in step 504 and the subsequent steps in FIG. 19 (the processing in step 608 and the subsequent steps in FIG. 23).

Embodiment 3C-B: Simultaneous Image Receiving Scheme

Embodiment 3C-A is suited for a case wherein a target is kept still. More specifically, according to Embodiment 3C-A, since the individual image receiving scheme is employed, the images ① and ② are picked up at different timings. If, therefore, the target moves or the image pickup environment changes with time, the device cannot accurately measure the distance to the target. In contrast to this, according to Embodiment 3C-B to be described below, since the simultaneous image capturing scheme is employed, i.e., the images ① and ② are picked up at the same timing, even if the target moves or the image pickup environment changes with time, the device can measure the distance to the target.

Embodiment 3C-B1

FIG. 29 shows the main part of this embodiment. In the embodiment, as in the case shown in FIG. 13, a V-shaped one-sided mirror 30-4 is used in place of the double-sided mirror 30-1. In this case, images ① and ② are picked up at the same time. More specifically, the image (viewed from the first direction) ① of a sensed object M1 reflected in a mirror 30-2 and the image (viewed from the second direction) ② of the sensed object M1 reflected in a mirror 30-3 are picked up in an overlapping state by the image pickup section of the CCD camera 10 through the V-shaped mirror 30-4.

A control section 20-1 loads image data 0 of the overlapping images ① and ② from the CCD camera 10 through a frame memory 20-5. The control section 20-1 performs masking for an area of the loaded image O excluding the image ①, and sets the resultant image as image data $O_1$. The control section 20-1 also performs masking for an area of the loaded image O excluding the image ②, and sets the resultant image as image data $O_2$.

Embodiment 3C-B2

In Embodiment 3C-B1 (FIG. 29), the V-shaped mirror 30-4 and the flat mirrors 30-2 and 30-3 are used. In contrast to this, in Embodiment 3C-B2, as in the case shown in FIG. 15, spherical mirrors 30-2', 30-3', and 30-4' are used, as shown in FIG. 30. In this case, these members are designed and arranged such that images ① and ② are picked up by the image pickup section of a CCD camera 10 when a target M1 is at a distance R2 or more. According to this embodiment, the measurable range is wider than that in Embodiment 3C-B1.

Embodiment 3C-B3

Figure 31:
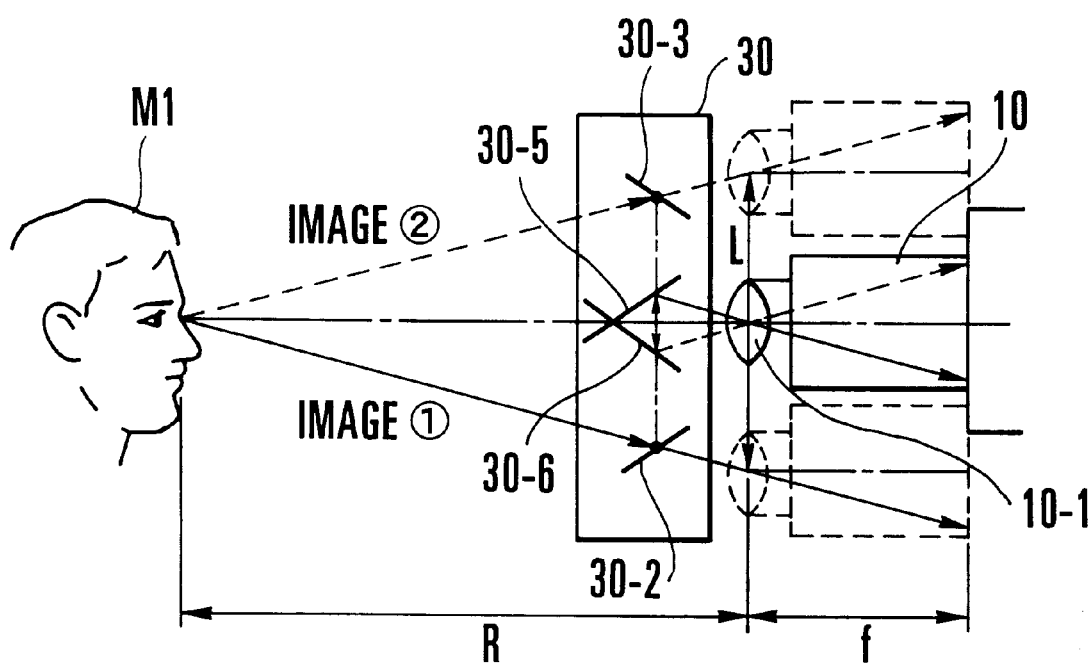
FIG. 31 is a view showing the main part of still another arrangement implementing three-dimensional image measurement with one camera.

In Embodiment 3C-B1 (FIG. 29), the V-shaped mirror 30-4 is used. In this case, since the width of the image captured by the CCD camera 10 is small, an improvement in precision cannot be expected. In this embodiment, therefore, as in the case shown in FIG. 16, two mirrors 30-5 and 30-6 are arranged vertically to intersect each other, as shown in FIG. 31. That is, the mirrors 30-5 and 30-6 are placed at upper and lower positions, respectively, to intersect each other. In addition, mirrors 30-2 and 30-3 are arranged at upper and lower positions, respectively, in correspondence with the mirrors 30-5 and 30-6. With this arrangement, images of a target M1 are respectively reflected in the mirrors 30-5 and 30-6, and an overlapping image of images ① and ② is picked up by the image pickup section of a CCD camera 10. In this case, since the width of the image is larger than that of the image received by using the V-shaped mirror 30-4, the precision improves.

Embodiment 3D

In Embodiments 3A, 3B, and 3C described above, CCD cameras are used as the cameras 10 and 11. These cameras, however, may be cameras with lenses or pinhole cameras (without lenses). A camera with a lens can pick up a brighter image than a pinhole camera. The image picked up by the camera with the lens, however, tends to be distorted.

In the above embodiment, referring to FIG. 18D, the entire area of the synthesized Fourier image data is set as a correlation component area, but a partial area may be set as a correlation component area. In this case, a correlation peak indicating the background appears at different positions depending on how a correlation component area is set. In this case, the position at which a correlation peak indicating the background is likely to appear is set as a reference position, and a correlation peak is extracted within a range excluding a portion near the reference position.

Embodiment 4: Distance Measuring Device (16th to 19th Aspects)

Figure 32:
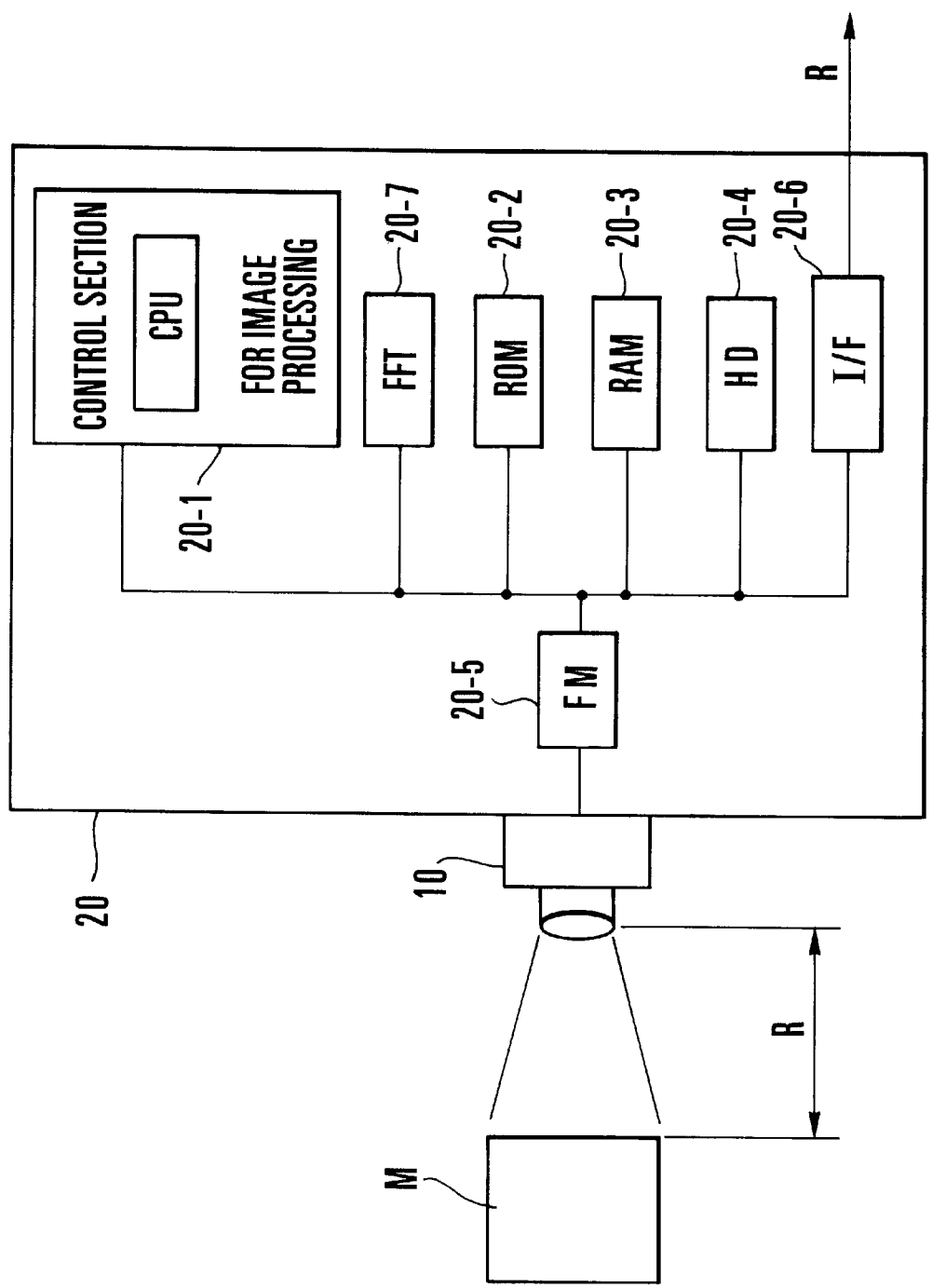
FIG. 32 is a block diagram showing the arrangement of a distance measuring device according to the present invention (16th to 19th aspects)

FIG. 32 shows the arrangement of a distance measuring device according to the present invention. Referring to FIG. 32, reference numeral 10 denotes a CCD camera; and 20, a control unit. The control unit 20 includes a control section 20-1 having a CPU, a ROM 20-2, a hard disk (HD) 20-4, a frame memory (FM) 20-5, an external connection section (I/F) 20-6, and a Fourier conversion section (FFT) 20-7. A registration program (see FIG. 35) and a distance measurement program (see FIG. 36) are stored in the ROM 20-2.

Figure 33:
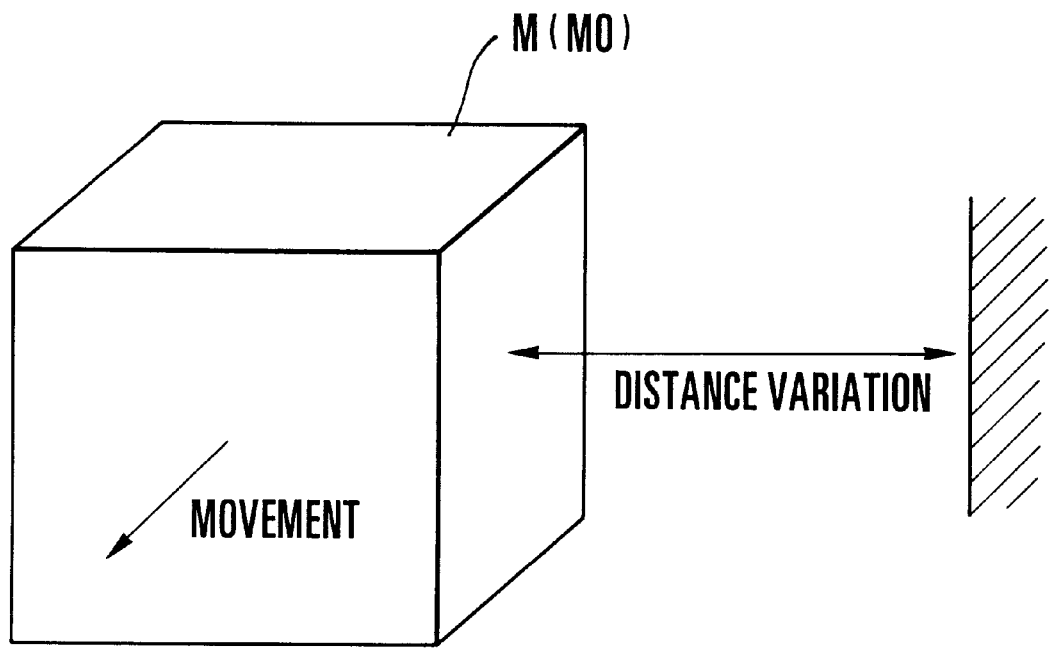
FIGS. 33A and 33B are views for explaining an object to be detected.
Figure 33:
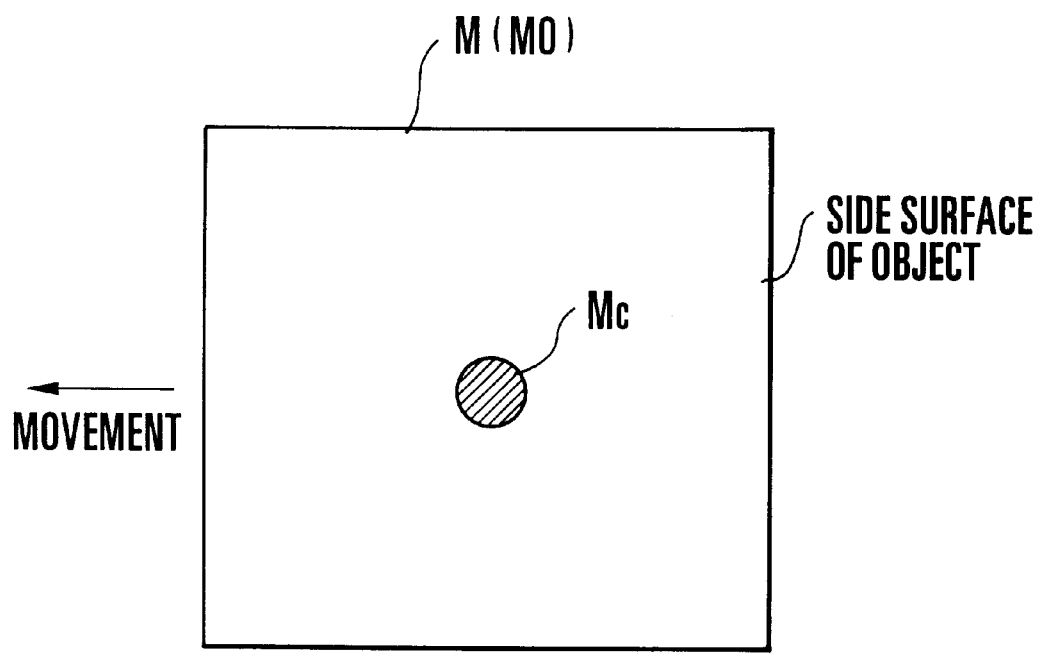

In this embodiment, as shown in FIG. 33A, it is assumed that when a box-like object M is conveyed along a convey line, the distance between a specific position and the object M is measured by this distance measuring device.

To implement distance measurement between the specific position and the object, for example, one circular mark Mc is added to a side surface of the object M in this embodiment, as shown in FIG. 33B.

The CCD camera 10 reads the image data on the side surface of the object M to which the circular mark Mc is added. When the distance between the specific position and the object is a predetermined reference value (reference distance), the image data (input image data) to be loaded has a predetermined diameter p, as shown in FIG. 34A.

In this embodiment, as shown in FIG. 34B, image data having a circle with a diameter q is defined as reference image data. That is, in this embodiment, image data obtained when a reference object M0 to which a collation mark having the same shape as that of the mark Mc is added is viewed at a predetermined reference distance is defined as reference image data.

Registration Processing

The control section 20-1 loads the reference image data through the frame memory 20-5 (step 701 in FIG. 35), and sends the loaded reference image data to the Fourier conversion section 20-7 to perform two-dimensional discrete Fourier transform (DFT) for the reference image data (step 702). The control section 20-1 performs amplitude suppression processing for the reference image data having undergone DFT (step 703), and stores the reference image data having undergone amplitude suppression processing as reference Fourier image data in the hard disk 20-4 (step 704).

In this embodiment, in the amplitude suppression processing, for example, all the amplitudes are set to 1. With this setting, only the phase components are extracted from two-dimensional discrete Fourier transform data, and reference Fourier image data obtained by extracting only the phase components are stored in the hard disk 20-4.

More specifically, two-dimensional discrete Fourier transform is performed for reference image data f(m, n) to obtain two-dimensional discrete Fourier transform data F(u, v) represented by $A(u, v) \times \exp[j\theta(u, v)]$. Amplitudes A(u, v) of the data are then forcibly set to, e.g., 1 to extract phase components $\exp[j\theta(u, v)]$ of the two-dimensional discrete Fourier transform data F(u, v). The reference Fourier image data obtained by extracting the phase components $\exp[j\theta(u, v)]$ from the two-dimensional discrete Fourier transform data are stored in the hard disk 20-4.

According to the pattern collation algorithm used in this embodiment, since there is no need to perform positioning in translation, the position of the circle of the input image data need not coincide with the position of the circle of the reference image data.

Distance Measurement Processing

Figure 36:
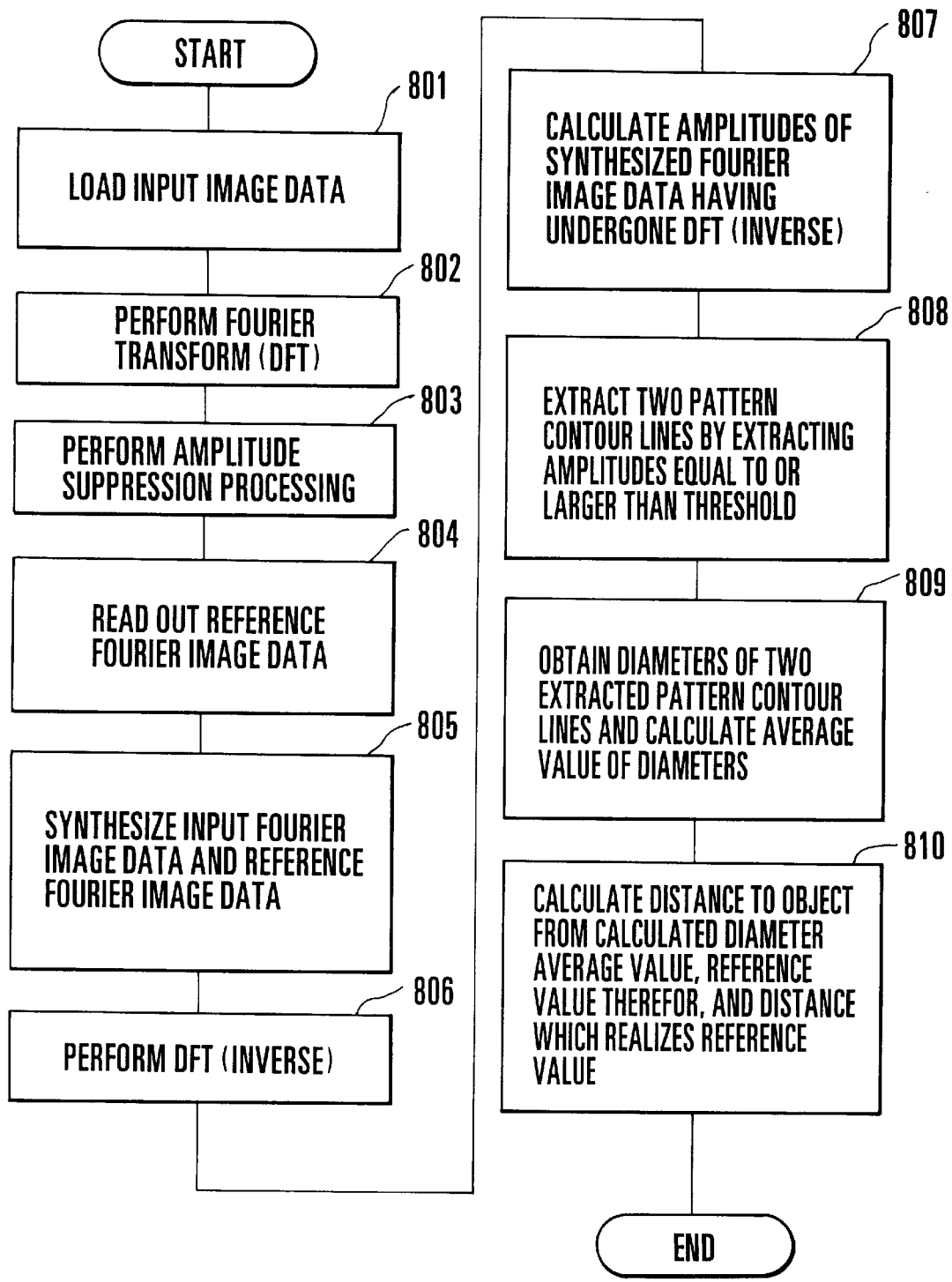
FIG. 36 is a flow chart for distance measurement program.

When a sensor (not shown) placed on the convey line detects that the object M, to which the circular mark Mc is added, stands still in front of the CCD camera 10, and a request to measure the distance to the object M is issued, the control section 20-1 loads the input data through the frame memory 20-5 (step 801 in FIG. 36). The control section 20-1 sends this loaded input image data to the Fourier conversion section 20-7 to perform two-dimensional discrete Fourier transform (DFT) for the input image (step 802). Amplitude suppression processing is then performed for the input image data having undergone DFT (step 803). This input image data having undergone amplitude suppression processing is set as input Fourier image data.

In this embodiment, in the amplitude suppression processing in step 803, for example, all the amplitudes are set to 1. With this setting, only the phase component is extracted from two-dimensional discrete Fourier transform data, and reference Fourier image data obtained by extracting only the phase components are stored in the hard disk 20-4.

More specifically, two-dimensional discrete Fourier transform is performed for input image data g(m, n) to obtain two-dimensional discrete Fourier transform data G(u, v) represented by $B(u, v) \times \exp[j\phi(u, v)]$. Amplitudes B(u, v) of the data are then forcibly set to, e.g., 1 to extract phase components $\exp[j\phi(u, v)]$ of the two-dimensional discrete Fourier transform data G(u, v). Input Fourier image data are then obtained by extracting this phase component $\exp[j\phi(u, v)]$ from the two-dimensional discrete Fourier transform data.

Subsequently, the control section 20-1 reads out the reference Fourier image data from the hard disk 20-4 (step 804), and synthesizes the readout reference Fourier image data and the input Fourier image data obtained in step 803 to obtain synthesized Fourier image data (step 805).

That is, the reference Fourier image data obtained by extracting only the phase components $\exp[j\theta(u, v)]$ and stored in the hard disk 20-4 and the input Fourier image data obtained by extracting only the phase components $\exp[j\phi(u, v)]$ in step 803 to obtain synthesized Fourier image data $\exp[j(\theta-\phi)]$.

The control section 20-1 performs second two-dimensional discrete Fourier transform for the synthesized Fourier image data obtained in step 805 (step 806). In this case, two-dimensional discrete inverse Fourier transform may be performed for the synthesized Fourier image data.

Subsequently, the control section 20-1 calculates the amplitudes of the synthesized Fourier image data having undergone two-dimensional discrete Fourier transform (step 807). More specifically, the control section 20-1 calculates amplitudes $(\alpha^2+\beta^2)^{1/2}$ of the two-dimensional discrete Fourier transform data represented by $\alpha(p, q)+j\beta(p, q)$. In this case, real parts $\alpha$ may be calculated instead of amplitudes.

The control section 20-1 searches for amplitudes, included in the amplitudes $(\alpha^2+\beta^2)^{1/2}$, which exceeds a predetermined threshold to extract a pattern contour line (step 808).

Figure 37A:
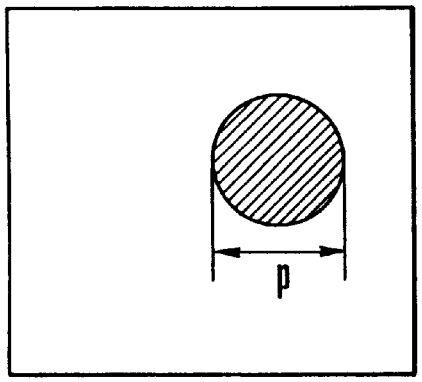
FIG. 37a–37c are views for explaining pattern contour lines obtained by collation processing.
Figure 37B:
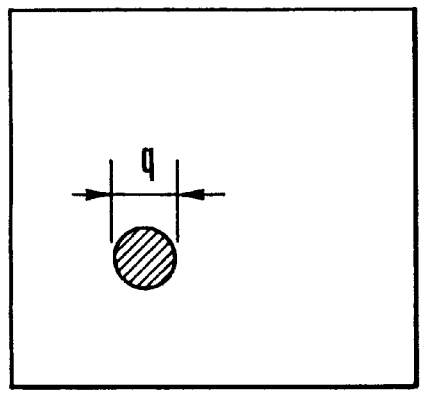
Figure 37C:
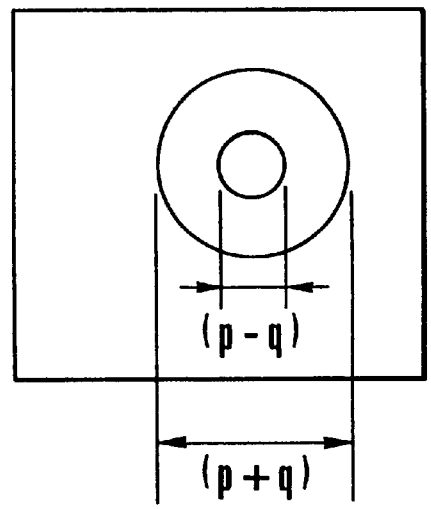

According to the experiment conducted by the present inventor, the input image data having the circle with the diameter p in FIG. 34A and the reference image data having the circle with the diameter q in FIG. 34B were set as objects to be collated, and the processing in steps 801 to 807 was performed to obtain the amplitudes $(\alpha^2+\beta^2)^{1/2}$. When amplitudes, included in the amplitudes $(\alpha^2+\beta^2)^{1/2}$, which exceeded the predetermined threshold were extracted, a pattern contour line having a circle with a diameter (p−q) and a pattern contour line having a circle with a diameter (p+q) could be extracted, as shown in FIG. 37*a*–37*c*.

Figure 38:
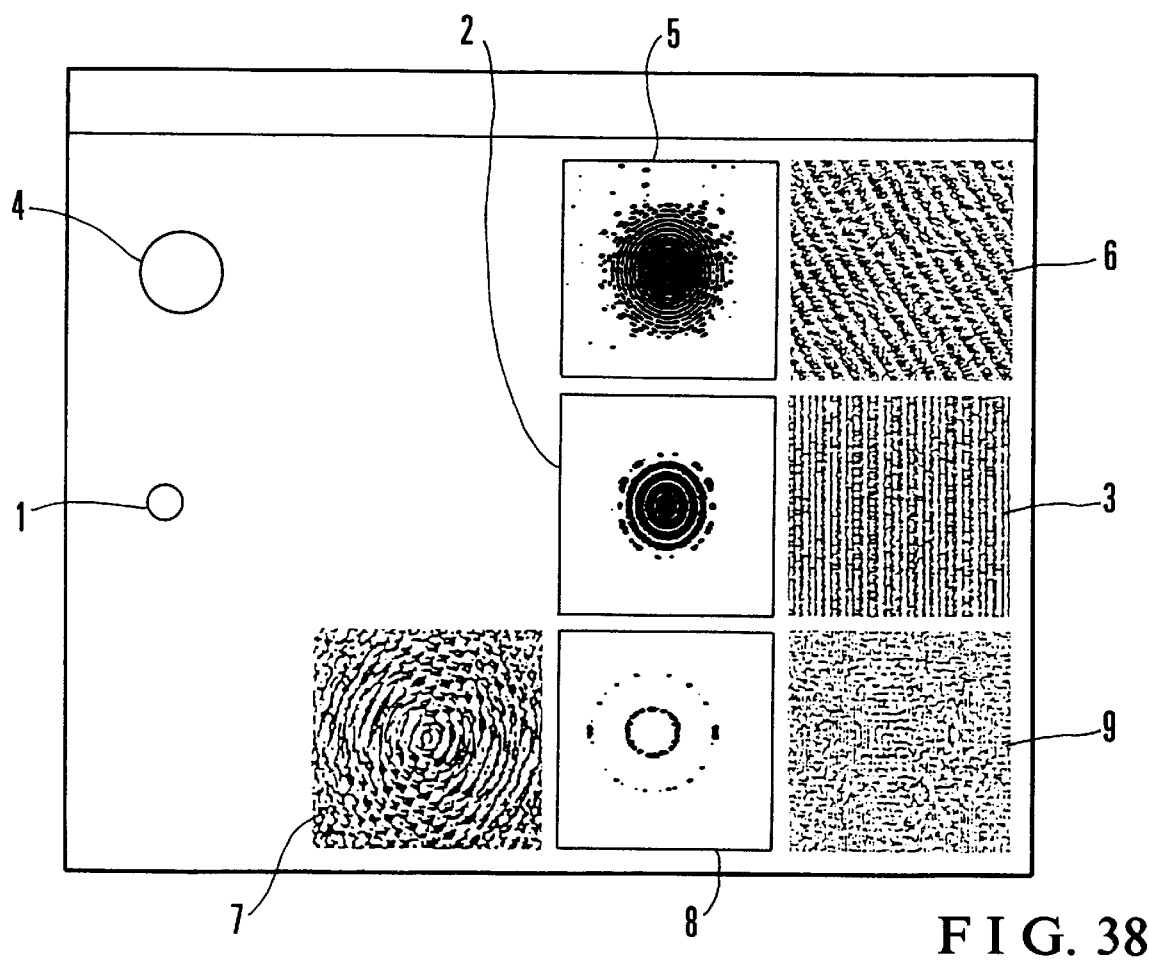
FIG. 38 is a view for explaining a halftone image (hard copy of an image on a CRT) obtained in the experiment conducted by the present inventor.

FIG. 38 shows an example of image data (hard copy from the CRT) obtained in this experiment.

Referring to FIG. 38, reference numeral ① denotes reference image data having a circle; ②, amplitudes A(u, v) of two-dimensional discrete Fourier transform data F(u, v) of the reference image data; ③, phase components exp[jθ(u, v)] of the two-dimensional discrete Fourier transform data of the reference image data; ④, input image data having a circle; ⑤, amplitudes B(u, v) of two-dimensional discrete Fourier transform data G(u, v) of the input image data; ⑥, phase components exp[jθ(u, v)] of the two-dimensional discrete Fourier transform data of the input image data; ⑦, phase components exp[j(θ−φ)] of the synthesized data; ⑧, the amplitudes of two-dimensional discrete Fourier transform data (α+jβ) of the phase components exp[j(θ−φ)]; and ⑨, the phase components of the two-dimensional discrete Fourier transform data (α+jβ).

When the average value of the diameters of the pattern contour lines extracted in step 808 is calculated, the diameter of the circle of the input image data can be immediately calculated.

Figure 39:
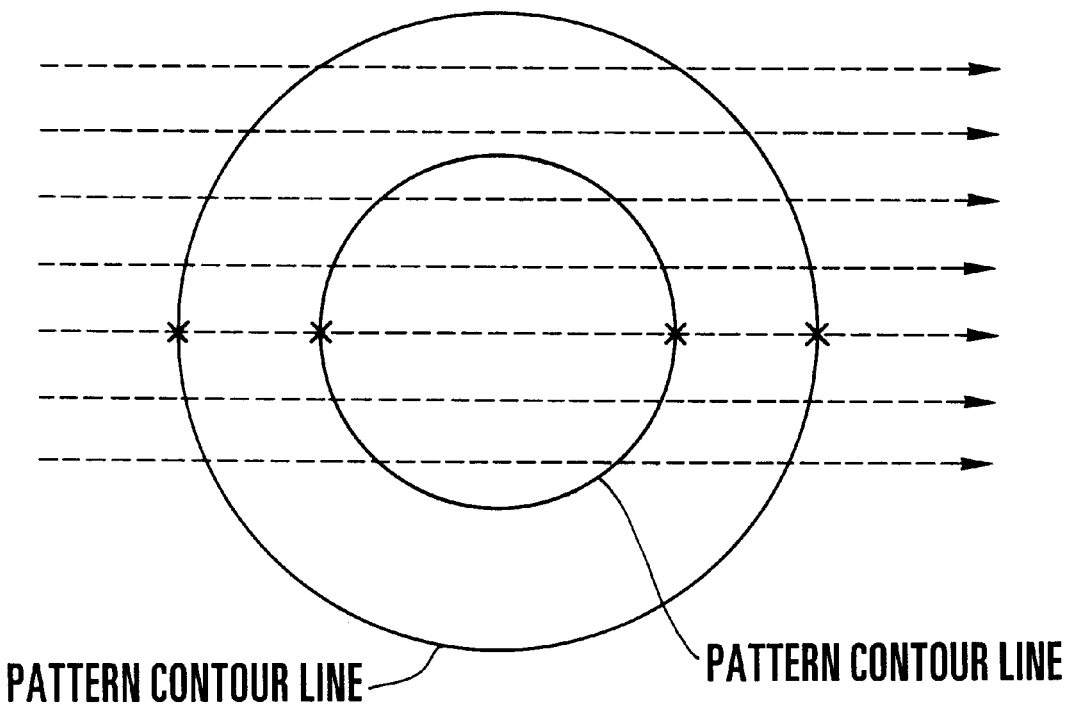
FIG. 39 is a view for explaining the process of detecting the diameters of pattern contour lines.
Figure 42:
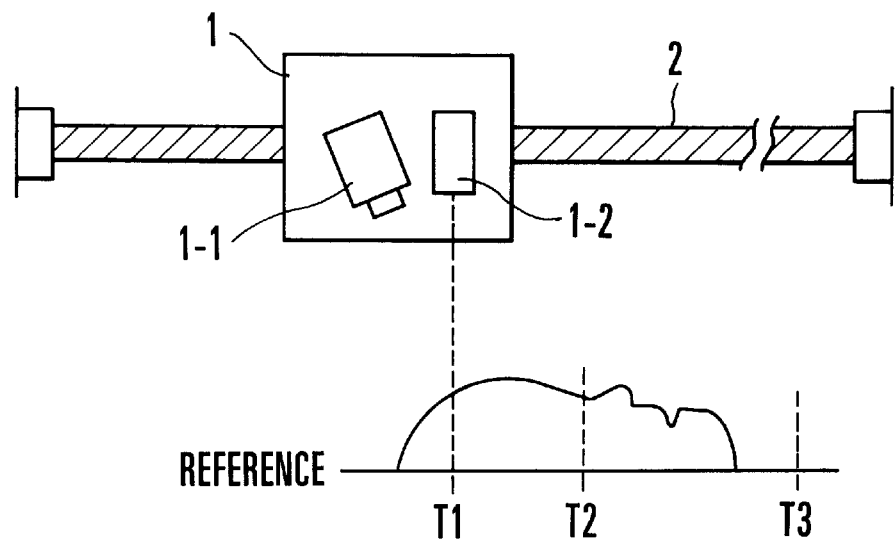
FIG. 42 is a view showing the main part of a conventional three-dimensional image measuring apparatus.
Figures 43A, 43B, 43C:
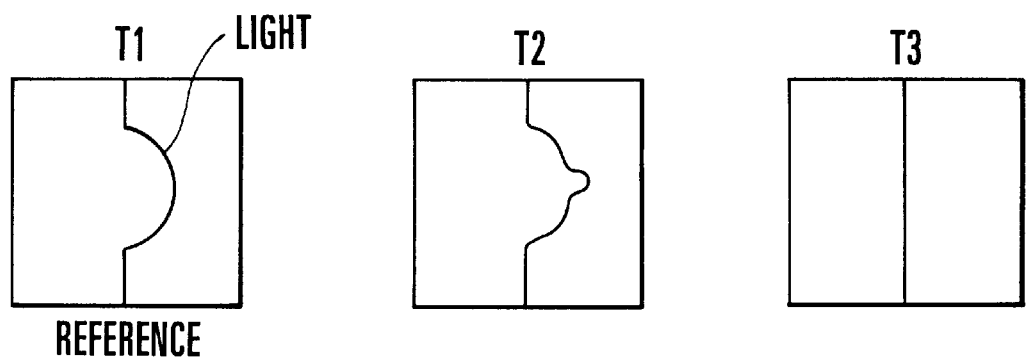
FIGS. 43A to 43C are views showing images received by this three-dimensional image measuring apparatus at time $T_1$, time $T_2$, and time $T_3$.

After the pattern contour lines of the two circles are extracted in step 808, the diameters of the pattern contour lines of these two circles are obtained, and the average value of the diameters is calculated, thereby obtaining the diameter of the circle of the input image data. In this case, the diameters of the pattern contour lines of the two circles are obtained by obtaining the maximum values by scanning the extracted pattern contour lines, as shown in, e.g., FIG. 39.

The control section 20-1 calculates the distance R to the object M from the diameter of the circle of the input image data calculated in step 809, the reference value for the diameter, and the distance to the object M which realizes the reference diameter, and the processing is complete (step 810).

This computation processing is performed by calculating a distance $L_2$ to the object according to the following equation:

$$L_2 = L_1 \times W_1 / W_2$$

where $W_1$ is the reference value of the diameter of the circle of the input image data, $W_2$ is the diameter of the circle of the input image data, and $L_1$ is the distance to be set to realize the reference diameter.

This equation is determined by the relationship between the image pickup position of the CCD camera 10, the lens of the CCD camera 10, the circular mark Mc, as shown in FIG. 40. That is, the distance L2 to the object M is obtained by using the fact that the diameter W2 of the circle of the input image data increases as the object M approaches from the reference distance L1.

In this embodiment, the circular mark is added to the object. However, instead of the circular mark, a graphical mark, such as a triangular mark, which changes its shape as it rotates may be used. In this case, when the posture of the mark of input image data does not match the posture of the mark of the reference image data, a high correlation may not be obtained. For this reason, many graphical patterns obtained when the mark rotates are developed as reference image data.

When a mark other than a circular mark is to be added, the distance to the object is calculated from the length of a side of the mark of the input image data, the reference value for the length of the side, and the distance to the object which realizes the reference value. When, for example, a triangular mark is to be added, the correlation increases, and the amplitude increases at the position of a vertex of the triangular mark, as shown in FIG. 41. For this reason, the lengths of portions having large amplitudes are calculated to obtain the length of a side of the mark, thereby calculating the distance to the object by using the reference value for the length of the side, and the distance to the object which realizes the reference value.

In this embodiment, only the phase components of the data obtained by synthesizing the two-dimensional discrete Fourier transform data of input image data with the two-dimensional discrete Fourier transform data of the reference image data are extracted, and pattern contour lines are extracted in accordance with the amplitudes of the two-dimensional discrete Fourier transform data of the phase components. Although the precision slightly deteriorates, pattern contour lines may be extracted in accordance with the amplitudes of the two-dimensional discrete Fourier transform data of synthesized data without performing amplitude suppression processing.

In this embodiment, the reference Fourier image data to be registered in the hard disk 20-4 is generated by this device by itself. However, reference Fourier image data may be generated in another place and stored in a floppy disk or the like, and the data may be downloaded into the hard disk 20-4. In this case, the distance measuring device according to the present invention includes a means for generating reference Fourier image data in another place.

In this embodiment, the amplitude of each two-dimensional discrete Fourier transform data is set to 1 to perform amplitude suppression processing. However, amplitude suppression may be performed by root processing or log processing, and two-dimensional discrete Fourier transform or two-dimensional inverse discrete Fourier transform may be performed for the resultant synthesized data.

In this case, although amplitude components are left in the synthesized data, since amplitude suppression processing has been performed for the data, measurement processing equivalent to that in the case wherein only phase components are extracted can be realized.

In this embodiment, after amplitude suppression processing is performed for reference image data and input image data having undergone two-dimensional discrete Fourier transform, the resultant data are synthesized. However, amplitude suppression processing may be performed after the data are synthesized.

In this embodiment, a two-dimensional graphical pattern is used as a mark. However, the embodiment can be applied to a case wherein a one-dimensional mark is used. In addition, the embodiment can be applied to a case in which a three-dimensional mark is defined.

This distance measuring device can perform processing which cannot be performed by the conventional distance measuring device which detects a distance R to an object M, and performs recognition of the model data recorded on the object M in accordance with the detection result.

If, for example, the model data is recorded on the object M, a plurality of collation image data respectively having symbols which can be recorded as the number data are registered in the hard disk 20-4 in advance. When the distance R to the object M is detected by using the circular mark Mc of input image data, the input image data is enlarged/reduced in accordance with the detected value to normalize the size of the model data. Thereafter, the input image data is sequentially collated with the collation image data, thereby performing recognition processing for the model data.

As is obvious from the above description, according to the first to fifth aspects of the present invention, image data from the first and second cameras are collated with each other on the basis of the spatial frequency characteristics, and the shift between the two images is obtained as this collation result, thereby easily measuring the distance to the target within a short period of time.

According to the sixth to ninth aspects of the present invention, images of a target viewed from the first and second directions are guided to the image pickup section of a single camera, and the image data of the target viewed from the first and second directions are collated with each other on the basis of the spatial frequency characteristics. The shift between the two images is obtained as the collation result, thereby easily measuring the distance to the object within a short period of time at a low cost.

According to the 10th to 15th aspects of the present invention, the image data of an object viewed from the first direction is collated with the image data of the object viewed from the second direction on the basis of the spatial frequency characteristics to measure the distance to a local area of the object as the collation result. By repeating measuring processing while sequentially cutting local areas from the image data of the object viewed from the first direction, a three-dimensional image of the object, even if it is moving, can be measured at a high speed and a low cost.

According to the 16th to 19th aspects of the present invention, the image data obtained when a reference object with a collation mark is viewed at a reference distance is collated with the image data obtained when an object with a mark is viewed at a predetermined measurement position on the basis of the spatial frequency characteristics to extract pattern contour lines, thereby detecting the size of the mark of the input image data. The distance to the object is calculated from the size of the mark, the reference value for the size, and the distance to the object which realizes the reference value. The distance to the object can therefore be measured easily within a short period of time at a low cost.

What is claimed is:

1. A distance measuring device comprising:
   first and second cameras spaced apart from each other by a predetermined distance;
   first Fourier pattern data generating means for setting image data picked up by said first camera as first pattern data, and generating first two-dimensional Fourier pattern data by performing two-dimensional discrete Fourier transform for the first pattern data;
   second Fourier pattern data generating means for setting image data picked up by said second camera as second pattern data, and generating second Fourier two-dimensional pattern data by performing two-dimensional discrete Fourier transform for the second pattern data;
   pattern processing means for synthesizing the first and second Fourier two-dimensional pattern data, and performing either two-dimensional discrete Fourier transform or two-dimensional discrete inverse Fourier transform for the resultant synthesized Fourier two-dimensional pattern data; and
   distance measuring means for measuring a distance to a target on the basis of a distance from a reference position in a correlation component area appearing in the synthesized Fourier two-dimensional pattern data having undergone Fourier transform performed by said pattern processing means to the position of a correlation peak obtained in a range excluding a portion near a reference position in the correlation component area.

2. A device according to claim 1, wherein said pattern processing means synthesizes the first and second Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

3. A device according to claim 1, wherein said first Fourier pattern data generating means sets the image picked up by said first camera as first pattern data, and generates first Fourier two-dimensional pattern data by performing amplitude suppression processing for the first pattern data after performing two-dimensional discrete Fourier transform therefor, and
   said second Fourier pattern data generating means sets the image picked up by said second camera as second pattern data, and generates second Fourier two-dimensional pattern data by performing-amplitude suppression processing for the second pattern data after performing two-dimensional discrete Fourier transform therefor.

4. A device according to claim 1, further comprising inter-lens distance adjusting means for automatically adjusting an inter-lens distance between said first and second cameras on the basis of the distance to the target, which is measured by said distance measuring means.

5. A distance measuring device comprising:
   one camera;
   image capturing means for guiding an image of a target viewed from a first direction and an image of the target viewed from a second direction to an image pickup section of said camera;
   first Fourier pattern data generating means for setting image data of the target viewed from the first direction and guided to said image pickup section of said camera as first pattern data, and generating first two-dimensional Fourier pattern data by performing two-dimensional discrete Fourier transform for the first pattern data;
   second Fourier pattern data generating means for setting image data of the target viewed from the second direction and guided to said image pickup section of said camera as second pattern data, and generating second Fourier two-dimensional pattern data by performing two-dimensional discrete Fourier transform for the second pattern data;
   pattern processing means for synthesizing the first and second Fourier two-dimensional pattern data, and performing either two-dimensional discrete Fourier transform or two-dimensional discrete inverse Fourier transform for the resultant synthesized Fourier two-dimensional pattern data; and
   distance measuring means for measuring a distance to a target on the basis of a distance from a reference position in a correlation component area appearing in the synthesized Fourier two-dimensional pattern data having undergone Fourier transform performed by said pattern processing means to the position of a correlation peak obtained in a range excluding a portion near a reference position in the correlation component area.

6. A device according to claim 5, wherein said pattern processing means synthesizes the first and second Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

7. A device according to claim 5, wherein said first Fourier pattern data generating means sets the image data of the target viewed from the first direction and guided to said image pickup section of said camera as first pattern data, and generates first Fourier two-dimensional pattern data by performing amplitude suppression processing for the first pattern data after performing two-dimensional discrete Fourier transform therefor, and said second Fourier pattern data generating means sets the image data of the target viewed from the second direction and guided to said image pickup section of said camera as second pattern data, and generates second Fourier two-dimensional pattern data by performing amplitude suppression processing for the second pattern data after performing two-dimensional discrete Fourier transform therefor.

8. A device according to any one of claims 5 to 7, wherein said camera is a pinhole camera.

9. An apparatus comprising:

first Fourier pattern data generating means for setting image data of an object viewed from a first direction as first pattern data, and generating first Fourier two-dimensional pattern data by performing two-dimensional discrete Fourier transform for the first pattern data;

local area cutting means for setting image data of the object viewed from a second direction as second pattern data, and cutting a local area from the second pattern data;

second Fourier pattern data generating means for generating second Fourier two-dimensional pattern data by performing two-dimensional discrete Fourier transform for pattern data of the local area cut by said local area cutting means;

pattern processing means for synthesizing the first and second Fourier two-dimensional pattern data, and performing either two-dimensional discrete Fourier transform or two-dimensional discrete inverse Fourier transform for the resultant synthesized Fourier two-dimensional pattern data; and distance measuring means for obtaining a correlation peak in a correlation component area appearing in the synthesized Fourier two-dimensional pattern data having undergone Fourier transform performed by said pattern processing means, and measuring a distance to the local area of the object on the basis of a distance from a reference position in the correlation component area to the position of the correlation peak.

10. An apparatus according to claim 9, wherein said pattern processing means synthesizes the first and second Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

11. An apparatus according to claim 9, wherein said first Fourier pattern data generating means sets the image data of the object viewed from the first direction and guided to said image pickup section of said camera as first pattern data, and generates first Fourier two-dimensional pattern data by performing amplitude suppression processing for the first pattern data after performing two-dimensional discrete Fourier transform therefor, and said second Fourier pattern data generating means generates second Fourier two-dimensional pattern data by performing amplitude suppression processing for the pattern data of the local area cut by said local area cutting means after performing two-dimensional discrete Fourier transform therefor.

12. An apparatus comprising:

first Fourier pattern data generating means forksetting image data of an object viewed from a first direction as first pattern data, dividing the first pattern data into areas in a horizontal or vertical direction, and performing two-dimensional discrete Fourier transform for pattern data of each of the resultant divided areas, thereby generating first Fourier two-dimensional pattern data in units of divided areas;

local area cutting means for setting image data of the object viewed from a second direction as second pattern data, and cutting a local area from the second pattern data;

second Fourier pattern data generating means for generating second Fourier two-dimensional pattern data by performing two-dimensional discrete Fourier transform for pattern data of the local area cut by said local area cutting means;

pattern processing means for synthesizing the second Fourier two-dimensional pattern data and the first Fourier two-dimensional pattern data of the divided area to which an area of the first pattern data which corresponds to the local area as a source of the second Fourier two-dimensional pattern data belongs, and performing either two-dimensional discrete Fourier transform or two-dimensional discrete inverse Fourier transform for the resultant synthesized Fourier two-dimensional pattern data; and distance measuring means for obtaining a correlation peak in a correlation component area, appearing in the synthesized Fourier two-dimensional pattern data having undergone Fourier transform performed by said pattern processing means, and measuring a distance to the local area of the object on the basis of a distance from a reference position in the correlation component area to the position of the correlation peak.

13. An-apparatus according to claim 12, wherein said pattern processing means synthesizes the first and second Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

14. An apparatus according to claim 12, wherein said first-Fourier pattern generating means sets the image data of the object viewed from the first direction as the first pattern data, divides the first pattern data into areas in the horizontal or vertical direction, and generates first Fourier two-dimensional pattern data in units of divided areas by performing amplitude suppression processing for the pattern data of each of the resultant divided areas after performing two-dimensional discrete Fourier transform therefor, and said second Fourier pattern data generating means generates second Fourier two-dimensional pattern data by performing amplitude suppression processing for the pattern data of the local area cut by said local area cutting means after performing two-dimensional discrete Fourier transform therefor.

15. A distance measuring device for measuring a distance to an object having a mark added thereto, comprising:

reference Fourier pattern data generating means for setting image data, as reference pattern data, which is obtained when a reference object to which a collation mark having the same shape as that of the mark is added is viewed at a reference distance, and generating reference Fourier two-dimensional pattern data by performing two-dimensional discrete Fourier transform for the reference pattern data;

input Fourier pattern data generating means for setting image data, as input pattern data, which is obtained when the object to which the mark is added is viewed at a predetermined measuring position, and generating input Fourier two-dimensional pattern data by performing two-dimensional discrete Fourier transform for the input patten data;

pattern processing means for synthesizing the reference Fourier two-dimensional pattern data and the input Fourier two-dimensional pattern data, and performing either two-dimensional discrete Fourier transform or two-dimensional discrete inverse Fourier transform for the resultant synthesized Fourier two-dimensional pattern data;

extraction means for extracting a pattern contour line indicating a real part or amplitude of the synthesized Fourier two-dimensional pattern data having undergone Fourier transform performed by said pattern processing means;

detection means for detecting a size of a mark in the input pattern data on the basis of the pattern contour line extracted by said extraction means; and distance calculation means for calculating a distance to the object on the basis of the size of the mark detected by said mark detection means, a reference value for the size, and a distance to the object which realizes the reference value.

16. A device according to claim 15, wherein said pattern processing means synthesizes the reference Fourier two-dimensional pattern data and the input Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

17. A device according to claim 15, wherein said reference Fourier pattern data generating means sets image data, as reference pattern data, which is obtained when the object to which the collation mark is added is viewed at the reference distance, and generates reference Fourier two-dimensional pattern data by performing amplitude suppression processing for the reference pattern data after performing two-dimensional discrete Fourier transform therefor, and said input Fourier pattern data generating means sets image data, as input pattern data, which is obtained when the object to which the mark is added is viewed at the predetermined measurement position, and generates input Fourier two-dimensional pattern data by performing amplitude suppression processing for the input pattern data after performing two-dimensional discrete Fourier transform therefor.

18. A device according to claims 15, 16, or 17, wherein a circular mark is used as the collation mark in accordance with the mark added to the object.

19. A device according claim 2, further comprising inter-lens distance adjusting means for automatically adjusting an inter-lens distance between said first and second cameras on the basis of the distance to the target, which is measured by said distance measuring means.

20. A device according to claim 3, further comprising inter-lens distance adjusting means for automatically adjusting an inter-lens distance between said first and second cameras on the basis of the distance to the target, which is measured by said distance measuring means.

21. A device according to claims 1,2,3,4,19 or 20, wherein said first and second cameras are pinhole cameras.

* * * * *